May 3, 1955
J. H. LESLIE II., ET AL
2,707,429
AUTOMATIC STRAPPING MACHINE
Filed Sept. 9, 1948
12 Sheets-Sheet 6
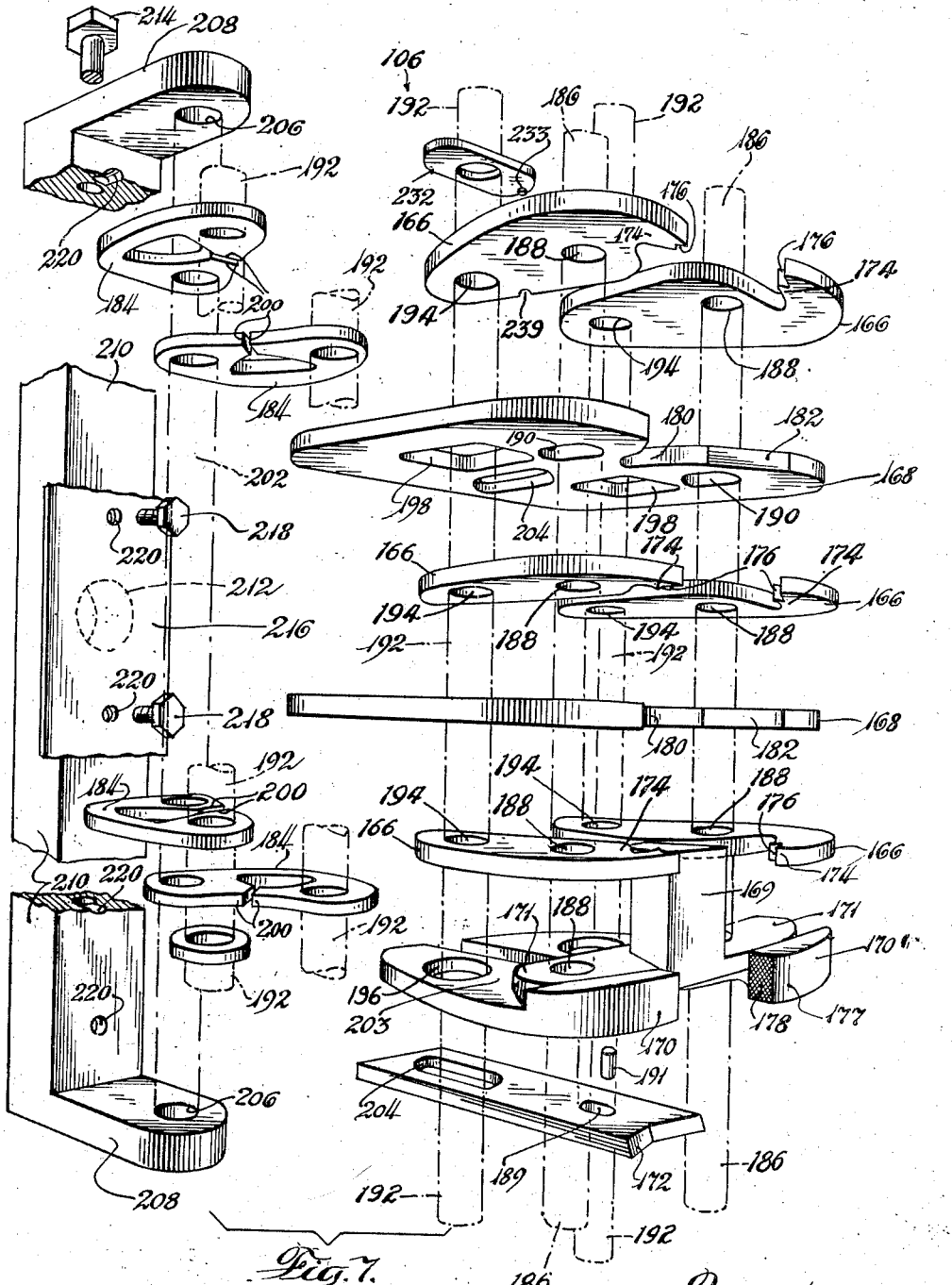

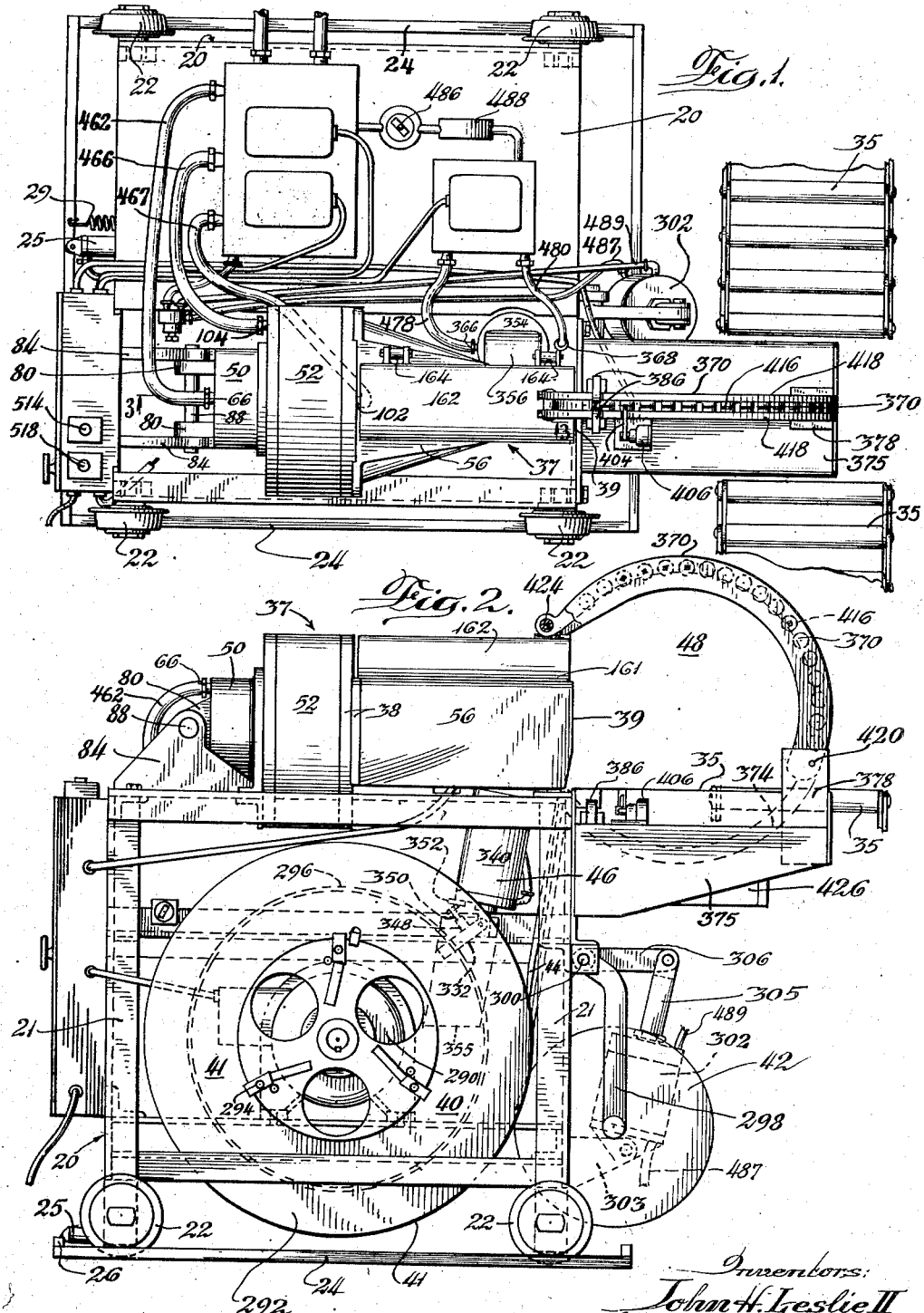

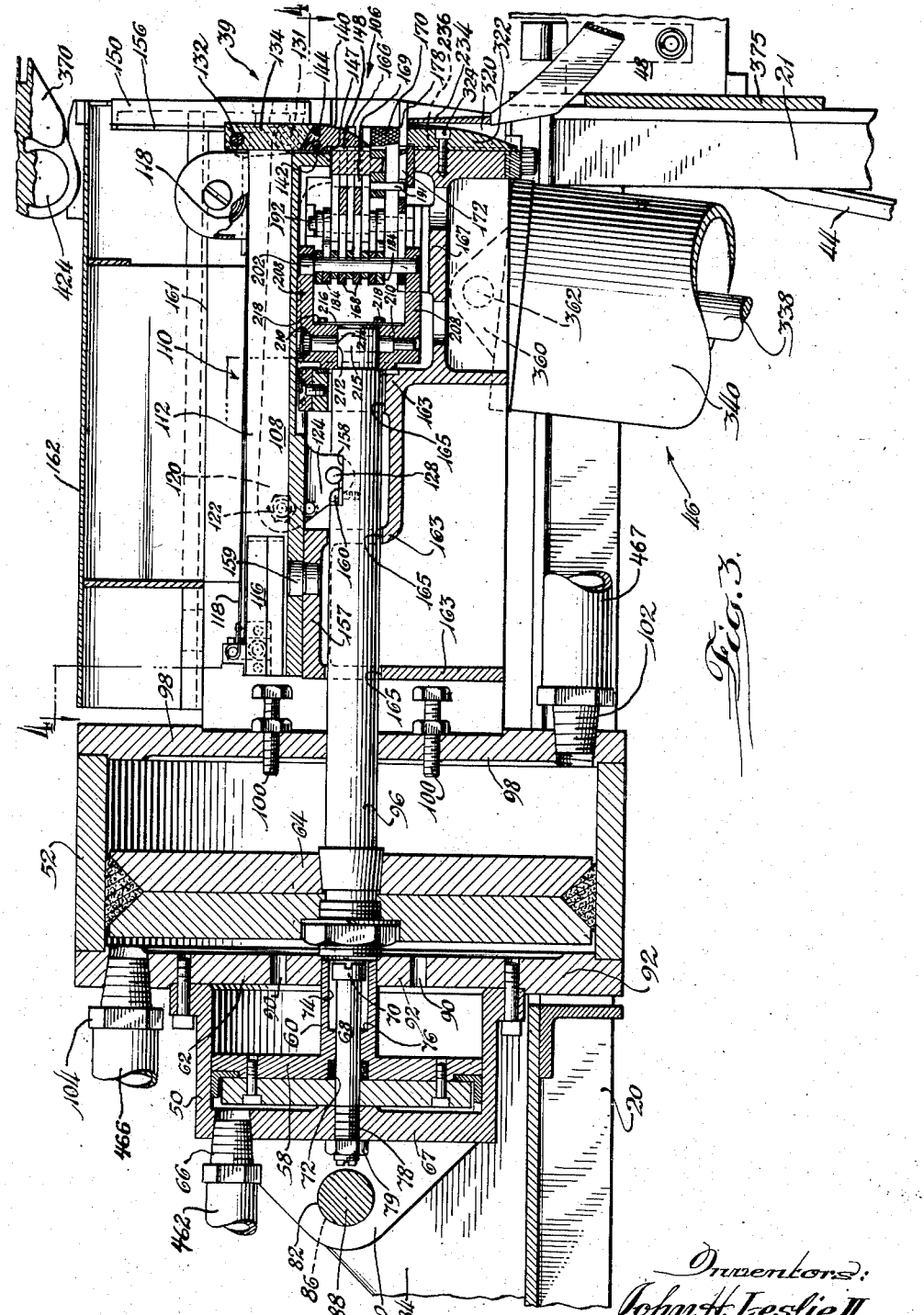

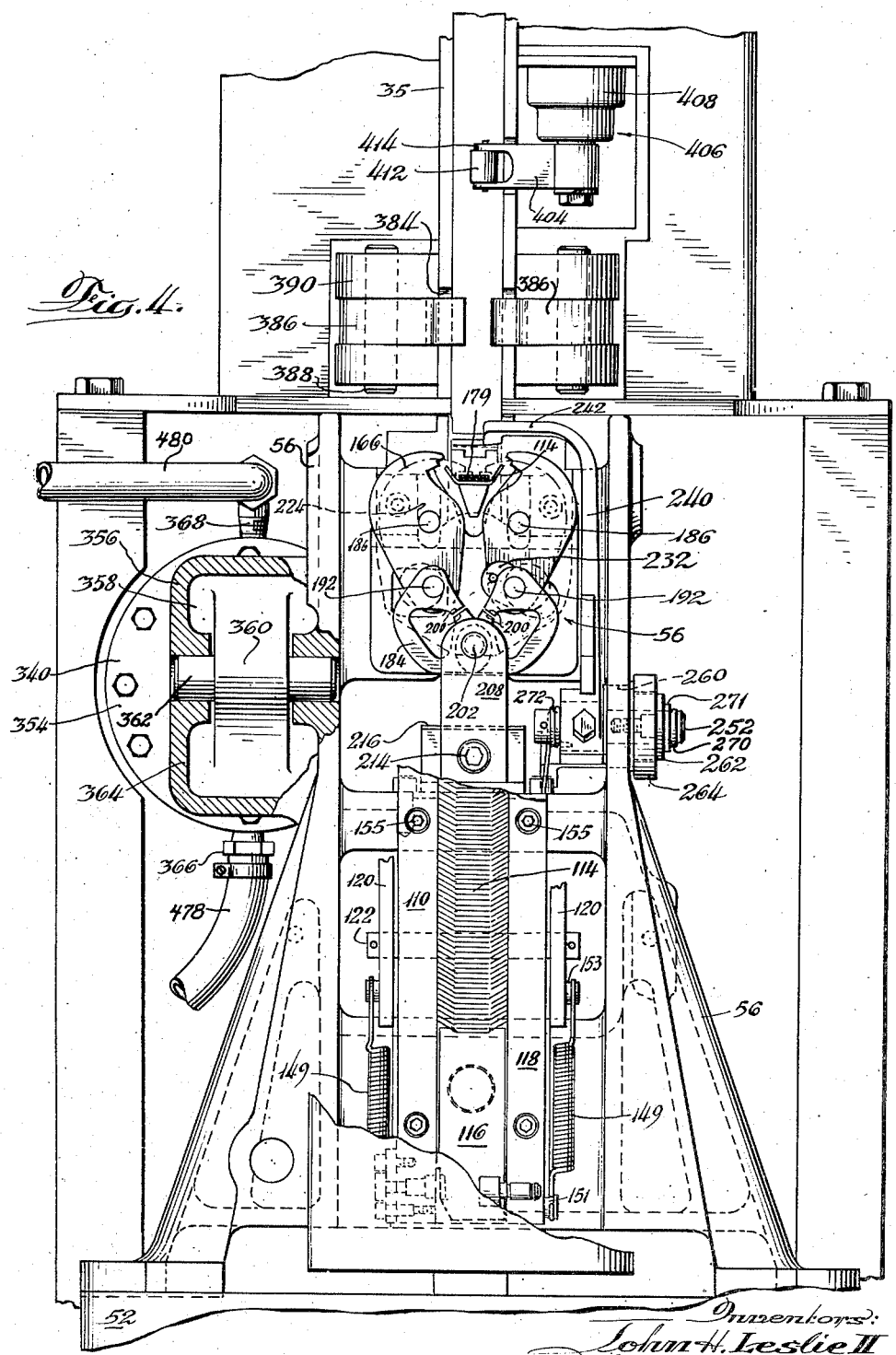

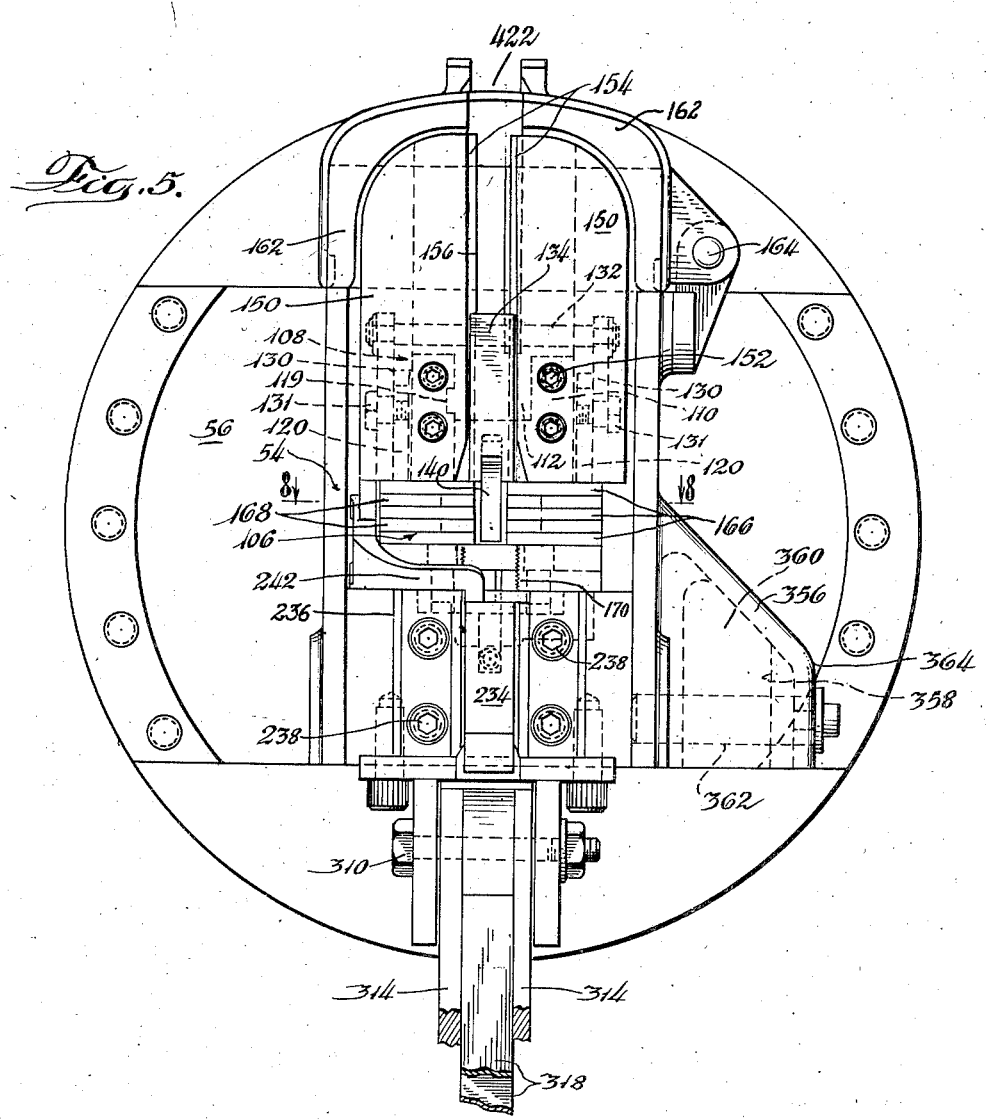

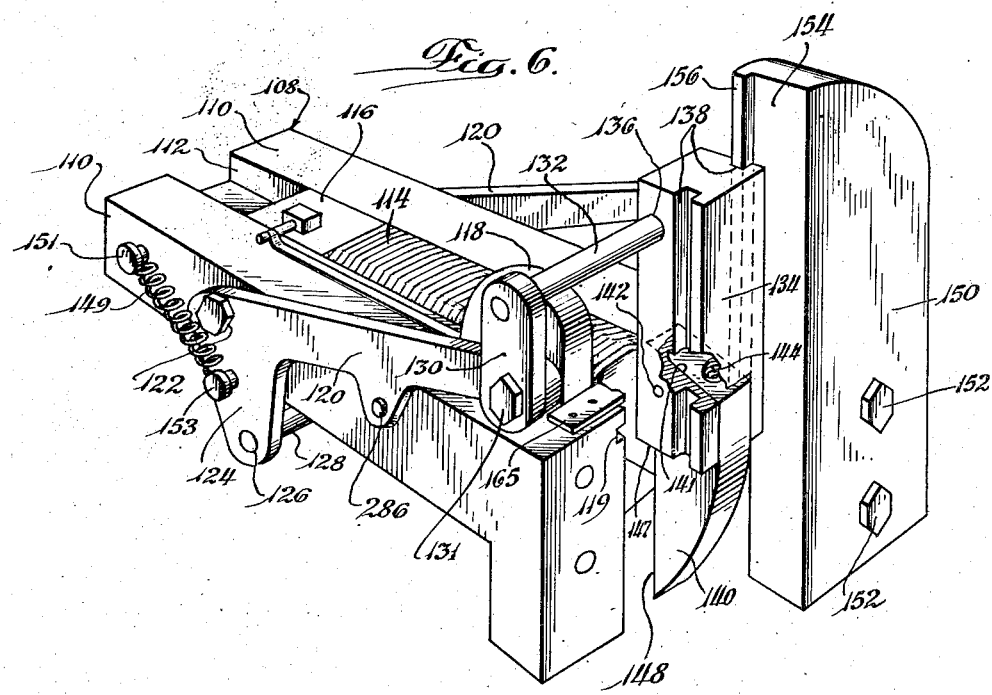
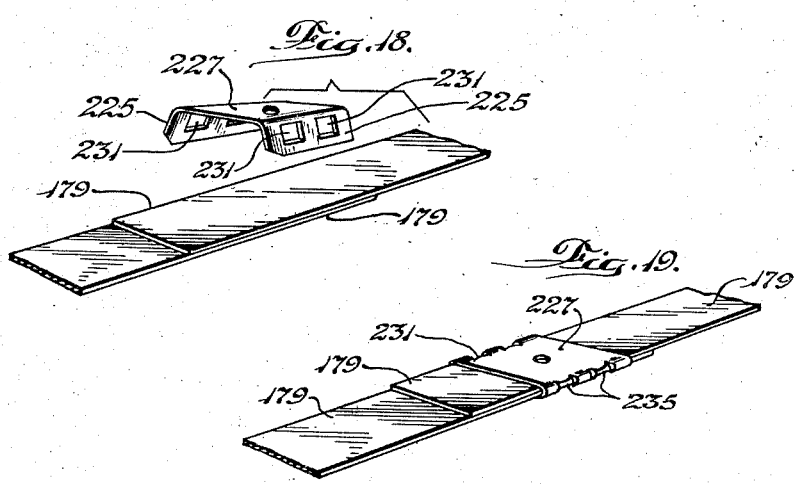

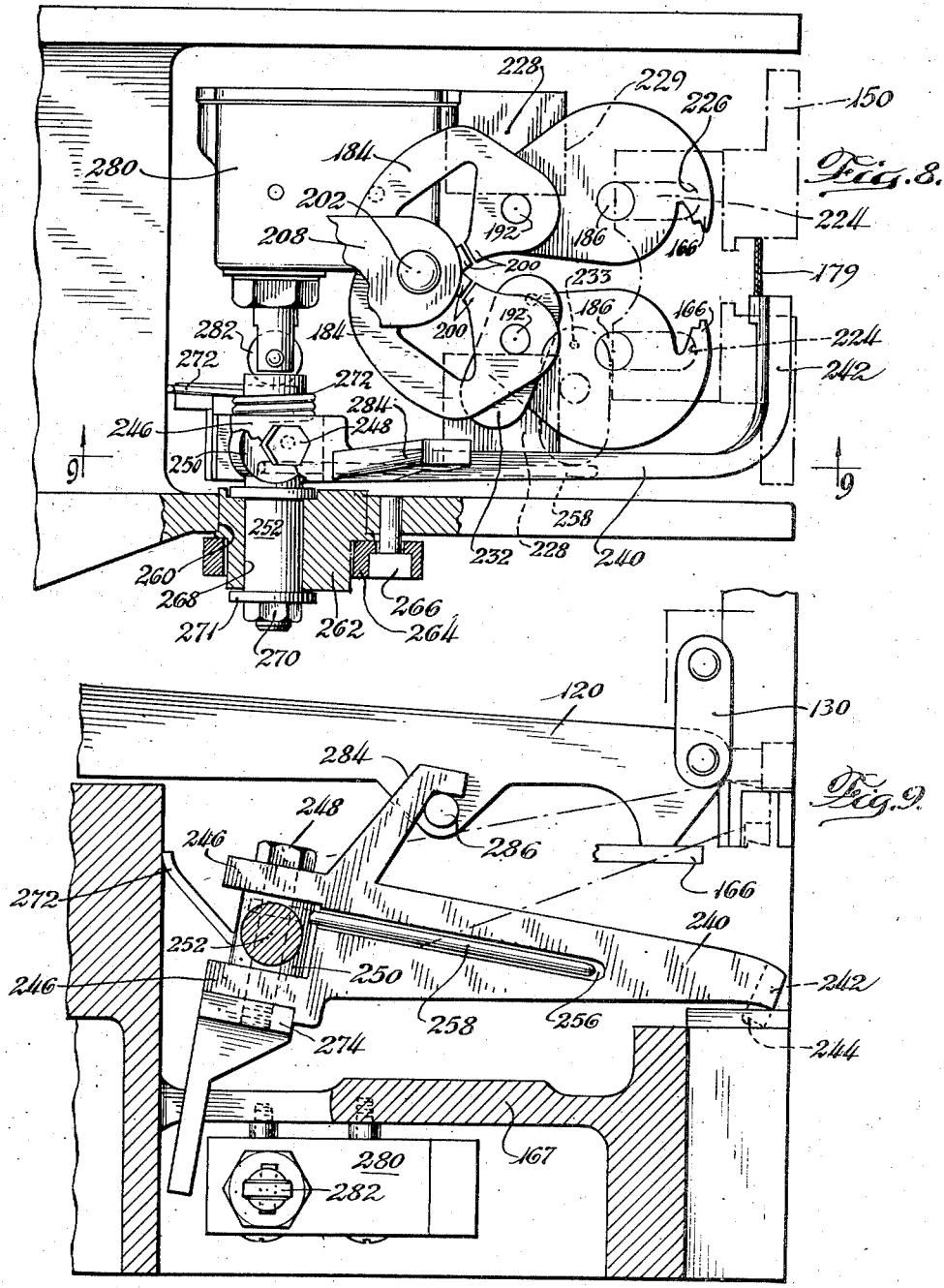

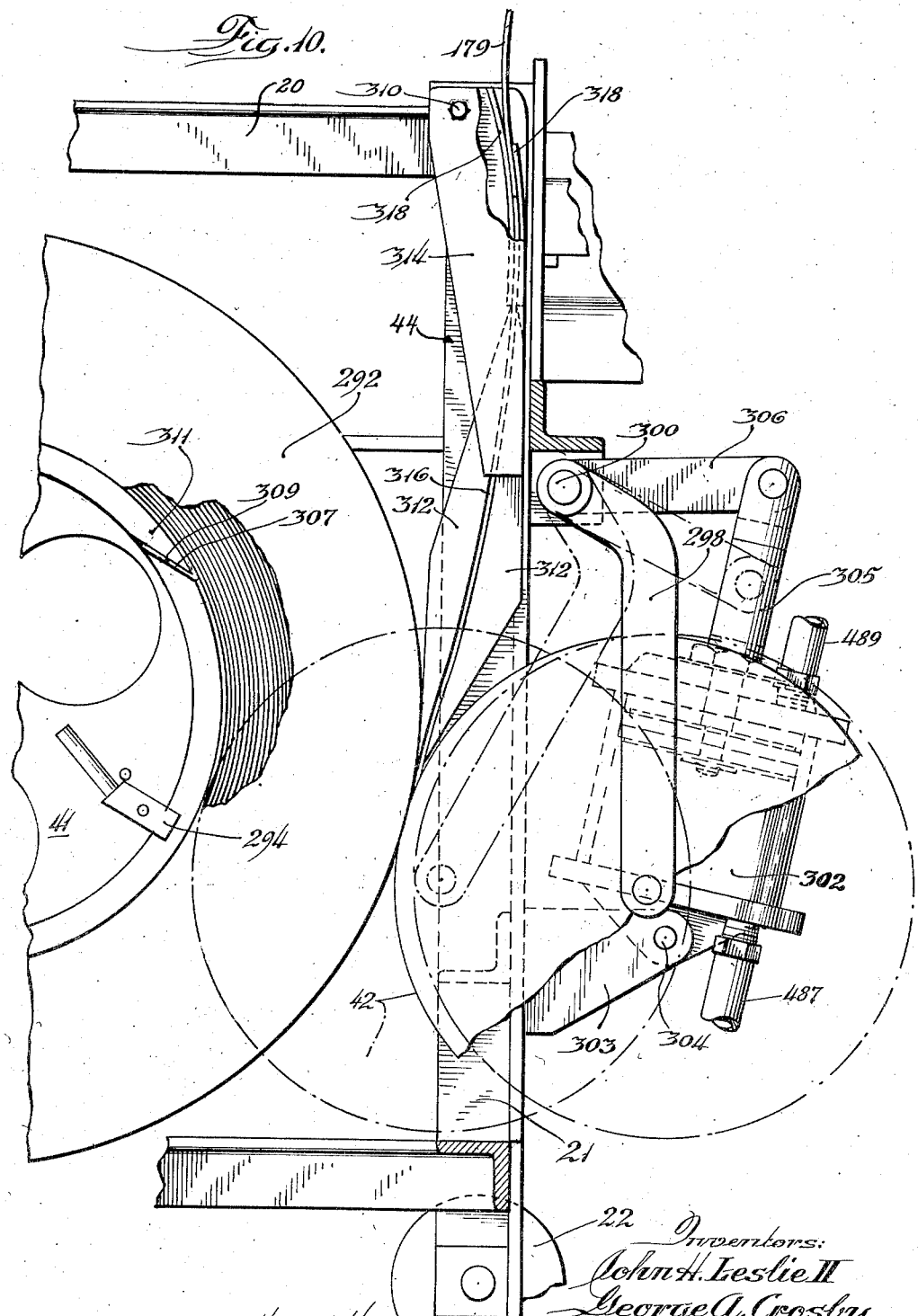

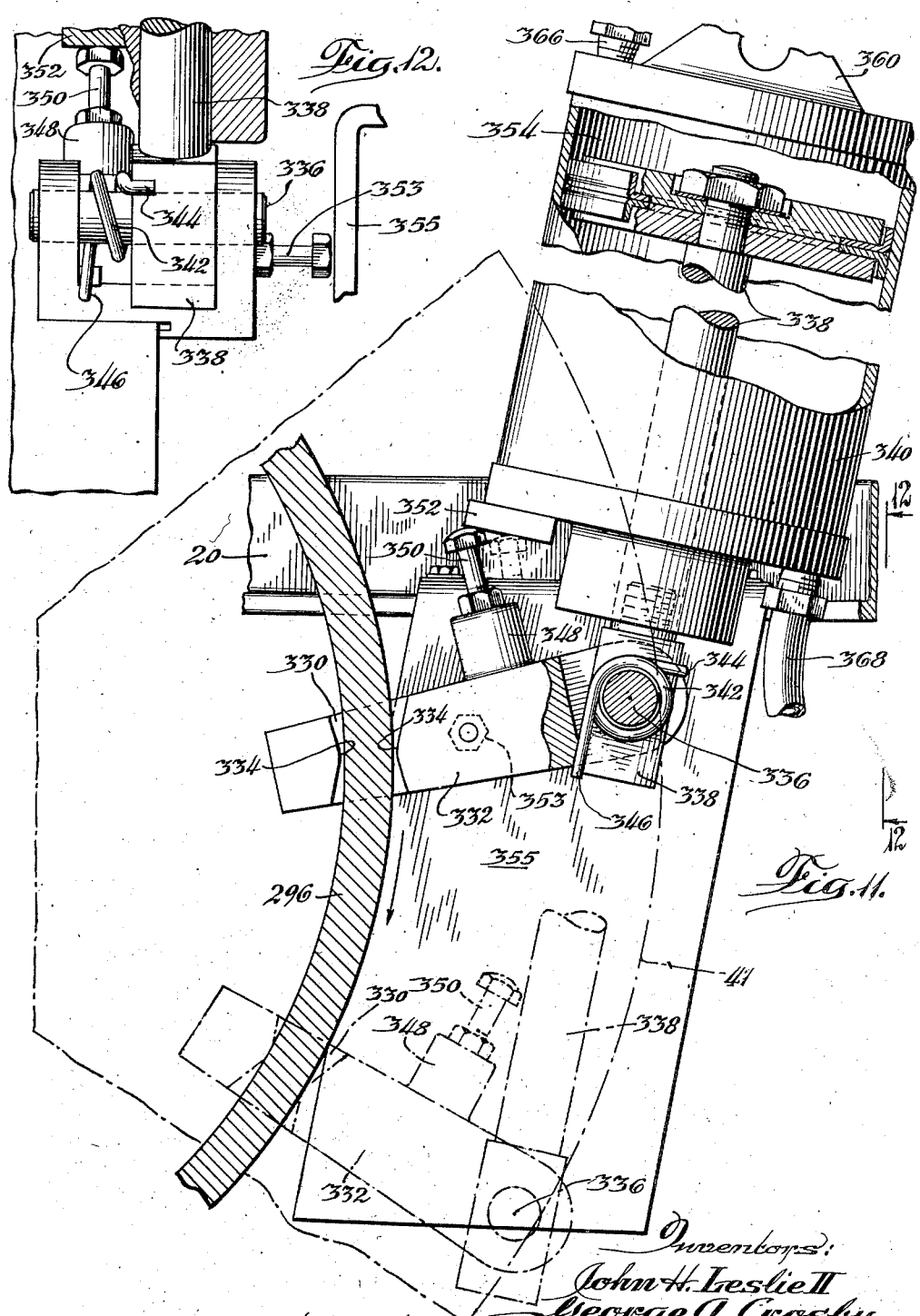

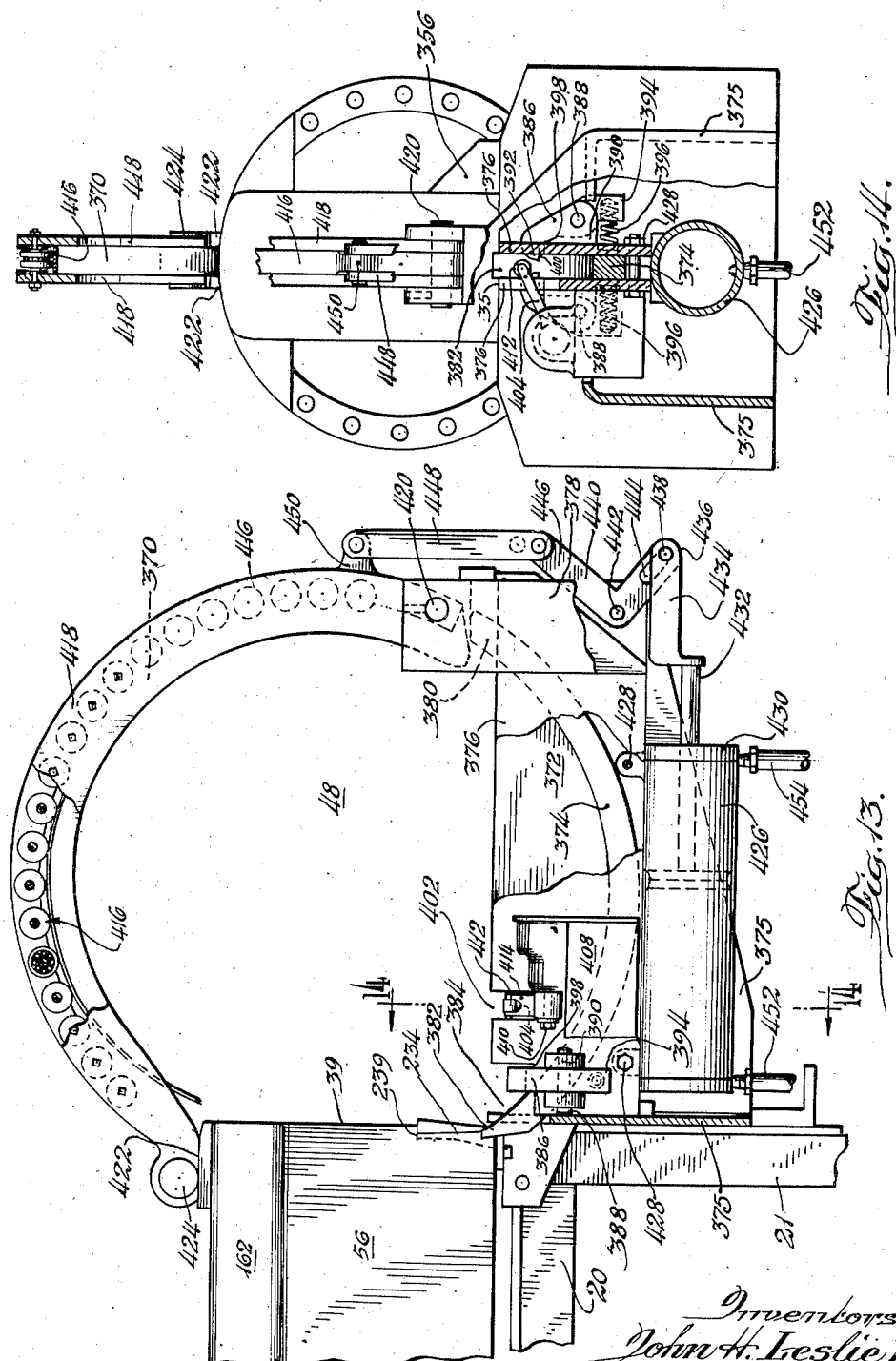

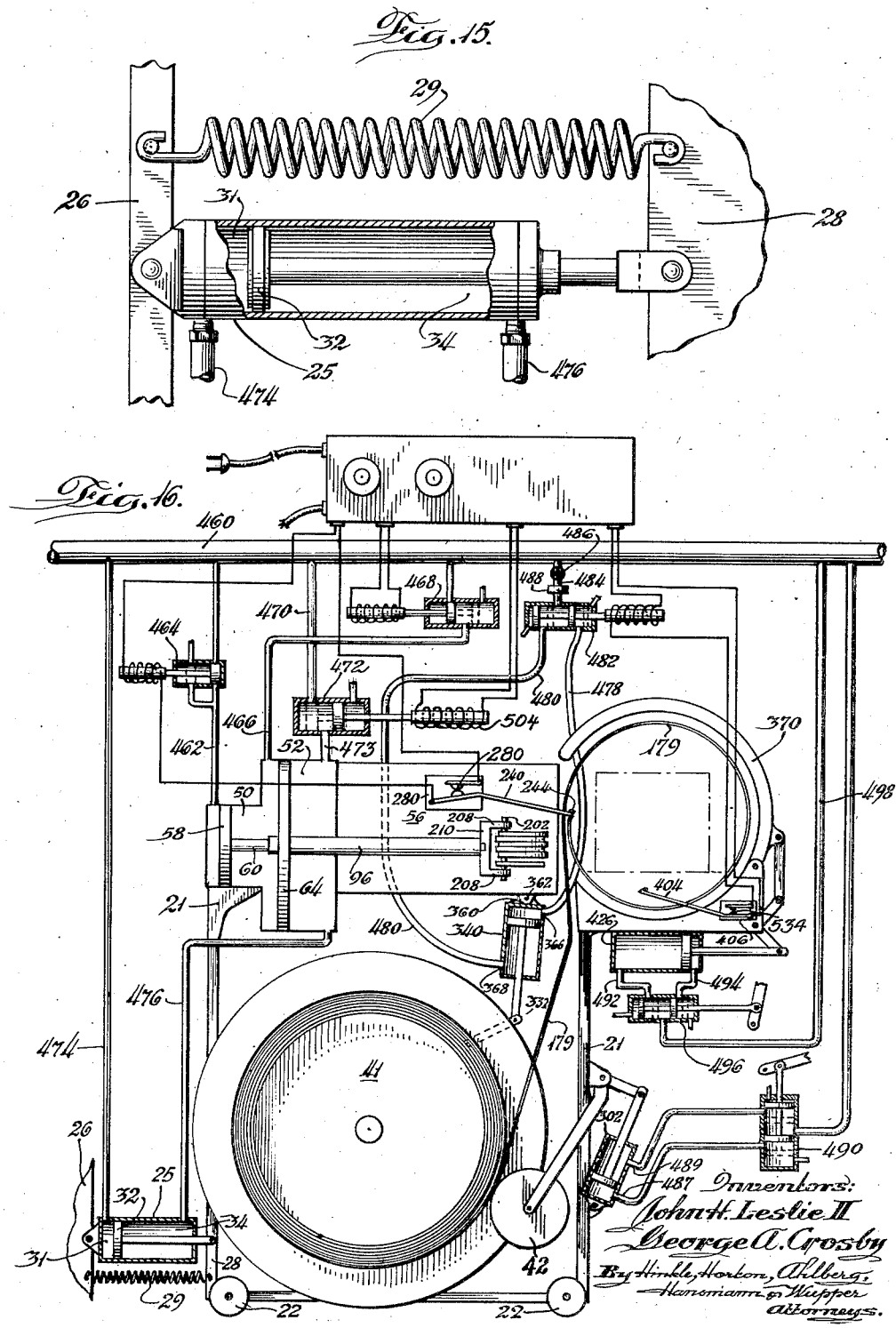

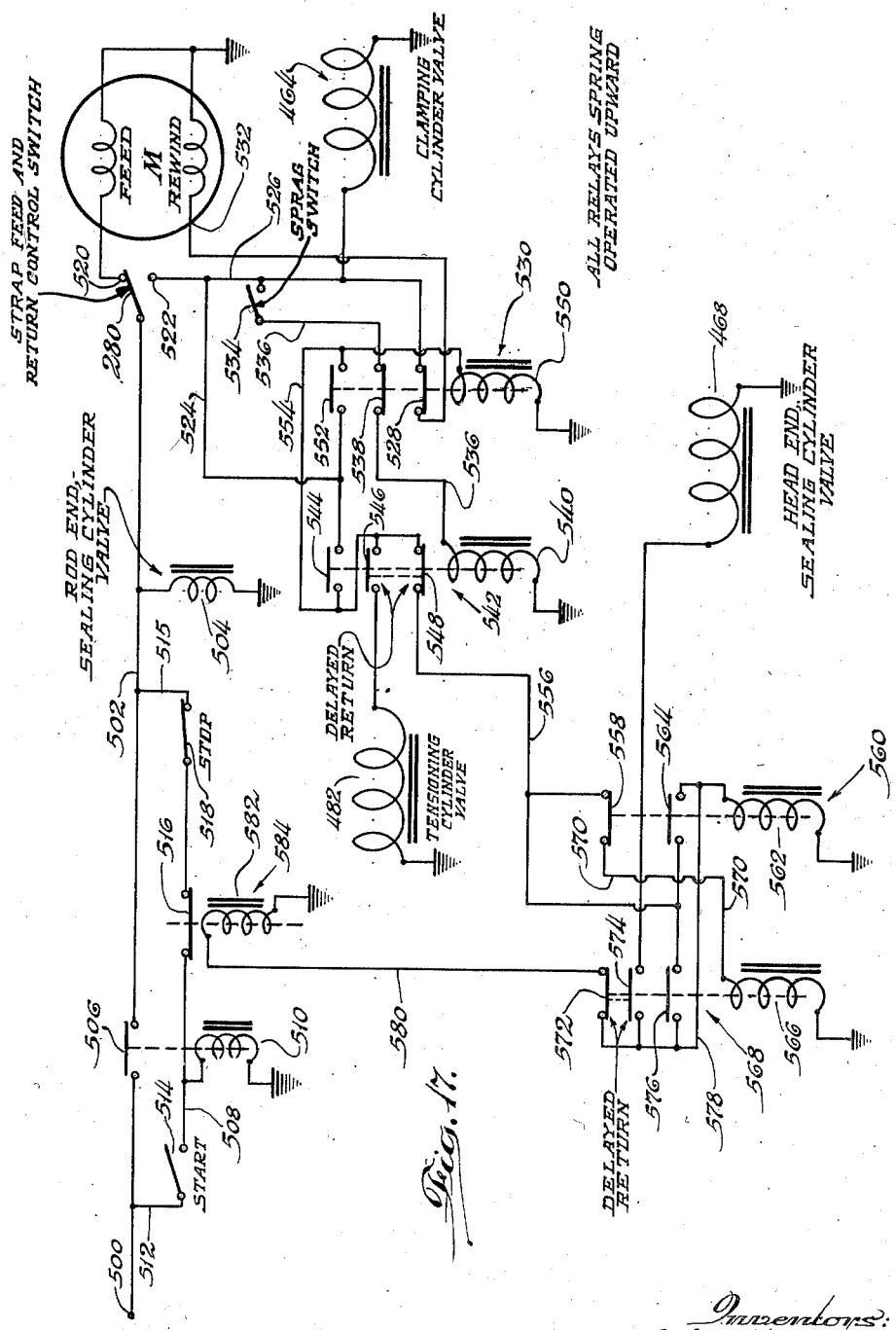

United States Patent Office 2,707,429
Patented May 3, 1955

2,707,429

AUTOMATIC STRAPPING MACHINE

John H. Leslie II, Evanston, and George A. Crosby, Park Ridge, Ill., assignors to Signode Steel Strapping Company, Chicago, Ill., a corporation of Delaware Application September 9, 1948, Serial No. 48,448

23 Claims. (Cl. 100—12)

Our invention relates to bundle binding machines.

More particularly it relates to an automatic machine for encircling a bundle with a tight loop of metallic strap or ribbon, the ends of which are joined together to retain the loop in tensioned bundle-binding condition.

A fully automatic bundle strapping machine—that is, one in which the metallic binder strap is fed from a source of supply and looped about the bundle, the bundle-encircling loop is tensioned tightly to bind together the constituents of the bundle into a compact whole, the bundle-encircling loop is separated from the source of binder strap supply, and the ends of the loop are, with the aid of a seal or clip, securely joined to make the tight loop permanent—offers many advantages in a variety of fields. For example, in the steel industry, with a machine that can effectively perform all of these operations upon the simple manipulation of a control switch or handle, better bundles can be produced at a saving of labor and expense and under conditions which render manual binding well nigh impossible. And yet, so far as we are aware, no sufficiently satisfactory machine of this character has heretofore been devised.

It is an object of our invention to provide an automatic bundle strapping machine that, among others, is productive of the following advantages which are perhaps of special significance in the steel industry:

Ability to bind bundles in the form of ringlike or annular coils of steel strip, with tight radially disposed strap loops, immediately following hot rolling operations when the material is at temperatures too high to permit manual manipulation.

Ability so tightly to bind steel strip coil bundles (either hot or cold) that the coils are and remain sufficiently compact that they may be more easily, safely and economically handled and transported, occupy less space in storage and during shipment, insure against damage, both to strip edges and surfaces, from loosening, uncoiling or intermeshing between adjacent coils, and contribute to meeting minimum weight-load requirements of railway cars and other freight transporting facilities and thereby lower shipping costs.

Ability to provide controlled and uniform strap-binder tension.

Ability to insure compact and tightly bound bundles of such commodities as bar stock, reinforcing rods, pipes, tubes and conduit, rod wire and what are generally termed "merchant mill products."

Ability to enable a single operator, through ability remotely to control a "battery" of several automatic machines, to effect simultaneously the binding at a number of separated points either, for example, about coiled commodities or long bundles composed of such commodities as lengths of pipe, tubing and conduit.

Ability safely and satisfactorily to bind bundles of commodities which cannot be safely or satisfactorily bound by hand tools, such as coils of spring wire.

Ability to strap bundles or packages of any size within the capacity of the machine without special adjustments for the varying sizes.

Ability to apply a tractive force to both ends of the strap surrounding a bundle so as to obtain more effective tensioning.

Other objects and advantages of our invention will become apparent from the following description of a preferred embodiment thereof which is illustrated in the accompanying drawings.

In the drawings:

Fig. 1 is a top plan view of a strapping machine embodying our invention;

Fig. 2 is an elevational view of that side of the machine which appears as the bottom of Fig. 1;

Fig. 3 is an enlarged sectional view of the clamping and sealing assembly taken substantially on the line 3—3 of Fig. 1;

Fig. 4 is a sectional view of the clamping and sealing mechanism taken substantially on the line 4—4 of Fig. 3;

Fig. 5 is an end elevational view of the clamping and sealing assembly;

Fig. 6 is a perspective view of the seal magazine and feeding assembly;

Fig. 7 is an exploded view of the clamping and sealing jaws and related mechanism;

Fig. 8 is an enlarged sectional view substantially on the line 8—8 of Fig. 5;

Fig. 9 is a sectional view taken substantially on the line 9—9 of Fig. 8;

Fig. 10 is an enlarged side elevational view of the strap reel, the feed guide and the idler roll;

Fig. 11 is an elevational view of the tensioning assembly;

Fig. 12 is an elevational view of the tensioning assembly which may be considered substantially as being taken over the span and in the direction of arrows 12—12 of Fig. 11;

Fig. 13 is an enlarged elevational view of the bundle or package encircling assembly strap track, broken away in part to illustrate related details of structure;

Fig. 14 is a sectional view taken substantially on the line 14—14 of Fig. 13;

Fig. 15 is a top plan view of the positioning mechanism for the strapping machine;

Fig. 16 is a diagrammatic representation of the strapping machine and particularly its pneumatic pressure system;

Fig. 17 is a diagrammatic representation of the electrical system;

Fig. 18 is a perspective view of the overlapping strap ends and a joint-reinforcing seal of the type used by the present machine; and Fig. 19 is a perspective view of a completed joint.

General

In general, our bundle binding machine, which will function entirely automatically upon the closing of an electric switch, comprises an annular strap track about which flexible metallic binder strapping is trained to form a loose loop encircling the bundle with the ends of the loop overlapping, a reversible motor-driven strapping storage reel, which when rotated one way feeds strapping about the track loosely to encircle the bundle and when rotated the other way retracts strapping to shrink the loop upon the bundle, an anchor for holding and exerting a pull in one direction upon one end of the strapping loop while the storage reel retracts the strapping and exerts upon the other end of the strapping loop a pull in the opposite direction, joining mechanism, preferably using a reinforcing seal, to unite permanently the overlapping ends of the shrunk loop and a strapping cutter, which, adjacent the joint, severs the strapping between the loop and the reel. A movable carriage may mount all of this mechanism to move it toward and retract it from the bundle to be bound, which is brought to and supported in binding position by, for example, a conveyor system. Annular or ring formed bundles can be bound with radially disposed binders by providing an annular strap track that may be opened to permit the machine and bundle to be properly associated and then closed so that the strapping loop may be passed through the hole of the bundle. The source of power for performing all of the operations of a binding cycle, except the reverse rotation of the strap-storage reel, is preferably pneumatic, the sequence being, in the main, under electric control.

In its preferred embodiment the machine incorporating our invention is mounted on a movable carriage having a flat table-like top 20 and four corner supporting legs 21. When it is intended that the machine be associated with a bundle conveyor, and more particularly when the bundles to be strapped have considerable weight, the legs of the carriage are furnished with wheels 22, and floor tracks 24 are provided on which the wheels may rest and ride. These tracks are oriented perpendicularly to the line of the conveyor so that the carriage may be brought forward into close proximity with the bundle delivery line or backed slightly away therefrom. A positioning assembly (Fig. 15) may be incorporated to produce this movement of the carriage, the assembly consisting of an air cylinder 25 fixed at one end to a cross rail 26 and at the other end to a leg brace 28, and a tension spring 29 fixed to the same two members. When pressure is admitted to the head end 31 of the cylinder, the piston 32 advances the carriage toward the delivery line against the force of the spring. When the air pressure is released, the tension spring 29 returns or retracts the carriage. The spring may be omitted from the assembly if provision is made for admitting air under pressure to the rod end 34 of the cylinder as well as to the head end to permit positive pressure application for moving the carriage in both the forward and rearward direction. The control of this positioning assembly may be integrated with the other controls of the machine to operate in timed relation therewith as will be subsequently described. A bundle support 35, which may be in the form of a roller type conveyor such as indicated in Figs. 1 and 2, supports a bundle in binding position relative to the carriage.

The other primary assemblies are a strap clamping or anchoring and sealing assembly 37 resting on and pivotally fastened to the table top, its face 39 being in vertical alignment with the inner edge of the package support, a strap feed assembly 40 located below the table top and composed generally of a strap reel 41, a slip-preventing idler roll 42, and a strap feed guide 44; a tensioning assembly 46 linking the strap reel and the clamping and sealing assembly which serves the purpose of tensioning the strap about the package; a package encircling strap track assembly 48 comprising in part a fixed section and in part a movable section, extending from the outer extremity of the fixed section arcuately upward to rest when closed on the clamping and sealing assembly; a pneumatic pressure system (Fig. 16); and an electrical control circuit (Fig. 17).

Strap anchoring and sealing assembly

Referring particularly to Figs. 1, 2, 3, 4 and 5, the strap anchoring or clamping and sealing or joint forming assembly is comprised generally of a clamping cylinder 50, a sealing cylinder 52 and a jaw assembly housing 56, all integrally assembled into what may be termed the strap anchoring and joint forming head. The clamping cylinder is the rearmost unit of the assembly. It contains a piston 58 and its associated piston rod 60 which passes through the forward wall 62 of cylinder 50 and abuts against the piston rod 96 of the sealing cylinder 52. A pressure inlet 66 is provided in the rear wall 67 of the clamping cylinder. An adjustable stop, which consists of a bolt 68 with an enlarged head 70, extends axially through the rear wall of the clamping cylinder and fits into a passage 72 extending through the piston rod 60 and piston 58. This passage is formed with a section 74 having an enlarged diameter near the forward end thereof to provide a shoulder 76 against which the head 70 of the bolt abuts to limit outward movement of the piston 58. The stop may be adjusted by a threaded portion 78 which protrudes through the rear wall of the cylinder, and a lock nut 79 threaded thereon. The head of the bolt may thus be established at any desired distance from the rear wall 67 of the cylinder. The rear wall 67 of cylinder 50 is formed exteriorly with a pair of parallel spaced ears 80 having aligned holes 82 formed in them. A pair of spaced flanges 84 extending upwardly from the carriage top have corresponding holes 86; and a pivot pin 88 links together the ears 80 of the clamping and sealing assembly and the table flanges 84, as shown most clearly in Fig. 1, so as to provide a pivotal connection between the table top and the rear end of the head carrying the strap clamping and sealing assembly. The forward wall of the clamping cylinder has passages 90 extending therethrough to provide communication between the clamping cylinder and the sealing cylinder.

The sealing cylinder 52 has a substantially greater diameter than the clamping cylinder and has a rear wall 92, a part of which constitutes the forward wall of the clamping cylinder. A piston 64 is contained therein having an associated piston rod 96 hereinafter termed the push rod which extends through the forward wall 98 of the cylinder into the jaw housing 56. This cylinder also is furnished with adjustable means for limiting the forward movement of its piston 64, these means consisting of a plurality of bolt stops 100 adjustably threaded into tapped holes in the forward wall so as to protrude any desired distance into the cylinder. Pressure fittings 102 and 104 are threaded respectively through the forward wall 98 and the exposed portion of the rear wall 92 of the sealing cylinder.

The jaw housing 56 encloses three principal subassemblies; the jaw assembly 106, the seal feed mechanism 108, and the strap feed control mechanism shown in detail in Figs. 5, 8 and 9, and hereinafter described. The seal feed assembly 108 (Figs. 3 and 6) comprises a rectangular block 110 which extends substantially the length of the jaw housing and has a channel 112 formed therein extending the length of it. This channel 112 constitutes the seal magazine in which a stack of nested seals 114 is placed. These seals are preferably of the type characterized, in a joint, by sheared and bent tabs or tongues at the edges and are fully described in the copending application of John H. Leslie II Serial No. 47,563; filed September 3, 1948; issued as Patent No. 2,610,374, dated September 16, 1952. A follower 116 actuated by the spring 118 is located in the seal magazine 112 and serves to urge the seals to the forward end thereof. A horizontal groove 119 is formed in one side of the magazine channel 112 which receives a complementary projection on the follower to hold the follower in the magazine.

Two seal ejector arms 120 lie along side the block 110 on either side thereof and are pivotally secured at their rear ends as by bolts 122 which are passed through holes (not numbered) in the arms 120 and are threaded into the block 110. Ears 124 project from the rear portion of the arms 120 downward below the bottom of the block, these ears having holes 126 formed therein in which a rod 128 is received to extend transversely beneath the block. The forward ends of the arms have upstanding links 130 pivotally fastened thereto at their lower ends as by bolts 131. The upper ends of the links are joined by a yoke 132 which carries an ejector slide 134 on its mid portion. This ejector is a generally rectangular member having a hole 136 formed transversely through its upper end through which the yoke 132 passes and guide groove 138 on the vertical sides thereof. A depending finger 140 is pivotally fixed by a transverse pin 142 at its upper end so as to lie partially within a notch 141 formed in the lower end of the ejector slide 134. A compression spring 144 situated between the finger and the ejector forward of the point of pivotal attachment and acting downwardly, urges the lower end of the finger inward toward the magazine. The inner face 148 of the finger is recessed from the plane of the inner ejector face, as shown most clearly in Figs. 3 and 6, so as to lie forward thereof whereby the lower edge of the ejector slide 134 defines a shoulder 147 which moves the seals from the magazine to the jaws during downward movement of the ejector, the finger serving to hold the seals in transit against the forward end of the magazine so that they cannot drop free. Face plates 150 are secured to the magazine block by bolts 152. These face plates are spaced slightly apart to define a strap track 154 and, on the inner side of the opposing faces, vertical ribs 156 are formed which engage the guide grooves 138 of the ejector so as to constitute tracks therefor.

The rod 128 connecting the ears 124 of the seal ejector arms 120 normally lodges in a notch 158 formed in the push rod 96. A small block of hardened steel 160 may be secured in the rear portion of the notch to provide a bearing plate for the rod 128.

Tension springs 149 are anchored to the rear end of the magazine block by studs 151 and to the ears 124 below bolts 122 by studs 153 so as to urge the forward ends of arms 120 downward. The magazine block 110 is secured by bolts 155 to a support 157 which is formed integrally with the housing 56. A large diameter locating pin 159 may be situated in the bottom of the block 110 to engage a complementary hole in the support 157. It will be noted that only the rear portion of the bottom of the block rests on the support. The forward portion constitutes the top wall of the jaw assembly and plays a functional part in the operation thereof.

The support 157 extends generally longitudinally through the housing 56 and furnishes three vertical walls indicated by numeral 163 through which push rod 96 passes by way of holes 165. At its forward horizontal portion the support 157 constitutes the floor 167 for the jaw assembly.

Therefore as the push rod 96 moves forward relative to the magazine, the hardened bearing plate 160 forces the rod 128 forward, thereby rotating the forward ends of arms 120 upward against the opposing tensional force of springs 149 to a point where the inner face 148 of the finger 140 comes in front of the foremost seal in the magazine 112 with shoulders 147 slightly thereabove. Thereafter when the push rod 96 moves rearwardly relative to the magazine, and thereby permits the forward ends of arms 120 to rotate downwardly under the tension of springs 149, the shoulder 147 of the ejector 134 forces the foremost seal downward to position it between the jaws. The housing 56 is split horizontally above the seal feed assembly as at 161 to provide a cover 162 having hinges 164 (Figs. 1 and 2) whereby the magazine is made easily accessible for reloading with seals. A bridge 165 (Fig. 6) secured at opposite ends to block 110 and bridging seal channel 112 adjacent its forward or seal discharge end serves to prevent the upward or retracting movement of ejector slide 134 from displacing seals from the magazine channel.

The push rod 96 is joined at its forward end to the jaw assembly 106 which may be seen best in Fig. 7. The jaw assembly comprises three pairs of seal folding jaws 166 with notchers 168 interposed between the pairs. Below this folding and notching assembly is mounted an anvil 169 which extends up through the assembly, a pair of edge gripping jaws 170 and a strap cutter 172. The seal folding jaws are opposed paired members, each of the pair being of generally oval shape and having a hooklike portion 174 extending forward and inward from the outer edge thereof. These hooklike portions terminate in notches 176 which are adapted to engage firmly the edges of the seal flanges. The clamping or strap gripping jaws 170 are formed similarly to the seal folding jaws except that the hooked ends 177 terminate in knurled vertical surfaces 178 to serve as edge grippers for the strap 179. Each notcher 168 is a generally rectangular platelike element having a deep notch 180 therein to clear the anvil. The outer edges of the notch are more obliquely tapered and provide surfaces 182 which bear against the edges of a folded strap-seal sandwich held by the folding jaws to notch the opposite edges thereof at points intermediate the folding jaws upon outward relative movement of the notchers. The anvil 169 is a member of generally triangular cross section oriented with the apex toward the rear and having ears 171 by which it is mounted in the assembly extending laterally outward from the lower edge thereof. The anvil extends upwardly through the group of seal folding and notching jaws, fitting in the rear part of the notch 180 in the latter elements and between the jaws of the former. The function served by this anvil is twofold. It provides the surface against which the ejector finger 140 holds the seal until the seal edges are caught by the notches 176 of the folding jaws, and it also provides the surface against which the seal is folded by the jaws. The anvil carries a cutter guide pin 191 which is press-fitted into an appropriate hole formed in the bottom thereof.

The mounting means for the jaw assembly consists in general of a series of five pins arranged in a roughly V-shaped fashion, holes being formed in the assembly members to accommodate these pins, and a plurality of links 184 to establish intermediate connections. The foremost pair of pins 186 pass vertically through forward holes 188 formed in the folding jaws 166, anvil ears 171 and strap edge grippers 170 and holes 190 in the notchers 168. The holes 188 are formed to fit these pins closely, while holes 190 in the notchers 168 are longitudinal slots which permit motion of the notchers independent of the pins in a forward and backward direction. The strap cutter 172 is situated directly below the strap edge grippers 170 and between the pins 186 and has a longitudinal slot 189 formed therein which receives the guide pin 191 to guide the movement of the cutter in the forward and rearward motions. Thus the cutter, as well as the notchers, may move longitudinally independently of the forward pins.

The intermediate pins 192 pass through rear holes 194 and 196 in the seal folding jaws 166 and the strap gripping jaws 170, respectively. The seal folding jaw holes 194 fit the pins closely, whereas the holes 196 in the strap gripping jaws are over sized to limit the motion of the knurled surfaces of the gripping jaws toward each other and avoid excessive pressure on or collapse of the edges of the strap. Provision for lost motion of the intermediate pins is made in the notching jaws 168 by providing large rectangular openings 198 to permit free pin movement in both the forward and lateral directions. The cutter 172 again lies between the pins 192 and is not inhibited in its motion thereby.

The links 184 are substantially U-shaped members having holes formed in the extremities thereof adapted to fit the intermediate connecting pins 192 closely. Abutment members 200 are formed on the inside of each arm of the U which nearly bridge the gap between the extremities. Thus a certain amount of resilience is provided in links 184 limited by the width of the gap between the abutment members. The links are paired, each of a pair fitting on one of the intermediate pins 192 and the rear pin 202 to couple the pins 192 to the rear pin. As here shown, upper and lower sets of the links 184 are employed. The upper set is located above the topmost set of folding jaws while the lower set is disposed within a recess 203 formed in the upper face of the rearward portion of the strap edge grippers 170.

The rear pin 202 passes through slots 204 in the notching jaws and cutter, but is not in engagement with the strap edge clamping or the seal folding jaws, as it lies behind and between the members of the pairs. The extremities of the rear pin are journaled in holes 206 in the arms 208 of a bracket 210 which serves to attach the jaw assembly to the forward end of the push rod 96. The attachment is made by a hole 212 through which the push rod passes and a locking screw 214, which passes through a hole in the reduced forward end 215 of the push rod as shown in Fig. 3. A hardened steel bearing plate 216 secured to the forward face of the bracket 210 by bolts 218 fitting in tapped holes 220 serves to communicate from push rod 96 the final forward movement of notchers 168 and movable cutter blade 172.

Referring additionally to Fig. 8, in the operating cycle of the machine, the jaw assembly starts from a retracted position behind the face plates 150 and side walls of the housing, advances initially to a seal folding and strap gripping position, then advances further to a sealing and strap cutting position, and finally returns to the starting retracted position. The forward pins 186 and intermediate pins 192 project substantially above and below the assembled jaws and cutter, and guides for the projecting ends are located in the bottom of the magazine block and in the floor 167 of the jaw assembly, the guide arrangement in both elements being substantially identical. The first of these guides comprise longitudinal slots 224 disposed parallel to the direction of jaw motion and which contain the upper and lower ends of forward pins 186 and have shoulders 226 at their forward ends to limit the forward movement of pins 186 therein. In the retracted position of the jaw assembly, the intermediate pins 192 lie slightly outward of lines between the rear pin 202 and each of the forward pins 186 such that as the jaw assembly is moved forward by forward movement of the rear pin 202 so as to bring the forward pins against the shoulders 226 of the guide slots 224, the intermediate pins 192 are urged forward with an outward force component. The second of the guides is for the purpose of controlling the movement of the intermediate pins and comprise generally rectangular blocks 228 formed on the bottom of the magazine block and on the floor of the jaw assembly which lie outwardly of the intermediate pins and against which the projecting ends of the intermediate pins 192 abut so as to limit their outward movement (thereby preventing premature collapse of the jaws) until the jaw assembly has been extended to its operating position. The length of the edges of the blocks in the forward and backward direction is approximately equivalent to the length of the slots 224 such that as the jaw assembly is moved forward, the forward pins reach the shoulders 226 and the intermediate pins reach the ends of the blocks at approximately the same moment. Thus the intermediate pins, passing the corners of the blocks 228 when the forward pins 186 reach the shoulders 226 are free to move laterally outward as the push rod 96 continues its forward motion.

With this jaw structure, as the machine is set in operation, the guide slots 224 and blocks 228 direct the assembly forward as a unit without relative movement between its parts until the shoulders 226 are reached. At this point the assembly is in a position where the strapping lies behind and between the hooklike portions 174 of the folding jaws 166 and the edges of the seal flanges 225 lie adjacent the notches 176 thereof with the notchers 168 opposite the seal windows 231 and the folding jaws spaced to grasp the edges of the seal between the windows. The windows 231 are for the purpose of providing clearance spaces into which tabs or tongues 235 formed by the notchers shearing the strap-seal sandwich are displaced thereby providing a smooth surface on the underside of the joint. When the shoulders 226 at the ends of the slots 224 are reached, the intermediate pins 192, having reached the ends of retaining blocks 228, travel outward, rotating the gripping and folding jaws about the forward pins 186 inwardly to perform their respective functions of folding the seal flanges 225 and of gripping the strapping 179. The back 227 of the seal is supported by the anvil 169 to prevent the rearward collapse thereof. The notchers and cutter meanwhile are moved a limited distance to a point near but spaced from the strap 179 and seal 114. In this clamping position the rear pin 202 is moved up to a position just behind the transverse line established by the intermediate pins 192, and the bracket 210, or bearing plate 216 if employed, is brought up into juxtaposition with the rear edges of the notchers and the cutter.

In the final sealing movement the rear pin 202 is moved slightly ahead of the transverse line established by the intermediate pins 192. This movement has no appreciable effect on the folding or clamping jaws, the rear pin moving within narrow limits on either side of the lines of the intermediate pins. The notchers and cutter however are forced forward by the bracket face or bearing plate 216 to notch and offset the overlapping strap portions into the windows of the folded seal, thereby completing the joint between the ends of the tensioned bundle encircling strap loop, and then to cut the strap adjacent the joint, thereby severing the loop from the source of strap supply. In the final retraction, the push rod 96 pulls the rear pin 202 back. The intermediate pins 192 therefore move inward since rearward movement is inhibited by the front faces 229 of the blocks 228. This results in opening the clamping and seal folding jaws. After the intermediate pins have cleared the forward faces of the guide blocks 228, the jaw assembly as a whole moves to the rear thereby retracting all of the jaws, the notchers and cutter. Now during the forward movement of the push rod, ejector slide 134 will have been raised above the magazine 112 permitting a seal to be moved by follower 116 into the path of the shoulder 147 on the slide 134 and against the inner face 148 of the finger 140; while at the end of the succeeding rearward movement of the push rod the ejector is moved downwardly by springs 149 to bring another seal into position between the then retracted and open jaws.

The purpose served by the particular type of resilient link 184 employed here is to accommodate variations in the seal or strapping dimensions by the small amount of lost motion available by virtue of the gap in the link. One of the intermediate pins 192 also has mounted on it an outwardly projecting strap feed control cam 232, which moves with the top folding jaw to which it is connected by an off center pin 233 seated in a notch 239 in the top of folding jaw 166 and the function of which will be later described. The movable cutter blade 172 cooperates with a stationary cutting block 234. This cutter block is a flat plate having a rectangular notch formed in the upper edge thereof, the bottom of the notch cooperating with the cutter to provide the shearing action. It is secured to the forward vertical surface 236 of the housing 56 by bolts 238, as indicated best in Figs. 3 and 5.

Referring particularly to Figs. 4, 8 and 9, the strap feed limit switch is comprised first of a switch arm 240 which is a substantially triangular member lying between the side wall of the housing and the jaw mechanism. The forward extremity of the arm is a finger 242 which bends around the jaw assembly to terminate in the path of a strap end moving upwardly through the strap trough as will be described more fully subsequently. A notch 244 is formed in the lower surface of the end of the finger which catches the end of the strapping passing upwardly through the trough. At the base of this triangular member, ears 246 are formed having holes extending therethrough to receive a bolt 248. The ears embrace a short cylindrical member 250 having an axial hole therethrough fitted to the bolt 248. Another hole of larger diameter extends through the cylindrical member 250 so as to intercept the bolt hole at right angles thereto thus forming a receptacle for a pivot pin 252. The pivot pin likewise has a hole formed transversely through the portion included in the receptacle similarly fitted to the bolt 248. The three members are thus fastened together by the single bolt 248. It will be noted that the arm 240 may pivot slightly in a horizontal plane about the bolt 248 so that the notch 244 may be swung into alignment with or to one side of the strap trough. A groove 256 is formed in the arm extending forward on the outer surface thereof away from the pivot. A flat spring 258 is secured at an end in the cylindrical member 250 and extends forward so as to lie within the groove 256. It acts to urge the arm inward to its normal position where it intercepts the end of a strap passing upwardly through the strap trough. The purpose served by this pivotal arrangement is to permit the fingers 242 of switch arm 240 to be moved laterally out of contact with the free end of the strap. Thus withdrawal is accomplished by arm 240 being pivoted outwardly by cam 232 shifting its position from that shown by the full lines to the position indicated by dotted lines (Fig. 8) as the intermediate pins 192 move outwardly during the seal folding operation. Hence, when the intermediate pins 192 of the jaw assembly move outwardly, the cam 232 is brought to bear against the inside surface of the arm 240, and by virtue of the arm's pivotal attachment, forces its notched finger 242 off the end of the strap. This withdrawal of the strap feed contact finger 242 facilitates removal of the bundle from the machine after the strapping operation has been completed.

A large hole 260 is formed in the jaw housing wall and in this hole is inserted an eccentric bushing 262 which is rotatable in the hole. The bushing 262 is locked in position by a clamping ring 264 and bolts 266. The pivot pin 252 is fitted in an opening 268 in the bushing eccentric with the outer surface thereof and is secured therein by means such as a bolt 270 threaded into the end of the pivot pin and provided with a washer 271. By loosening the clamping ring, the eccentric bushing 262 may be rotated to move the arm in a forward or rearward direction to position the notch 244 for optimum interception of the strap end. At the rear of the switch arm 240 a coil spring 272 is passed around the pivot 252 with one end seating in a hole in the member 250, and the other end bearing against the housing so as to urge the switch arm 240 downward about the pivot. The lower ear 246 of the arm 240 has a switch actuator 274 secured firmly thereto as by the bolt 248; and a switch 280, secured to the underside of the jaw assembly floor 107, has a button 282 which projects into the path of this actuator 274. As the strap emerges from the strap trough, the end thereof engages the notch 244 in the end of the arm 240. This has the effect of pivoting the arm about the pivot pin in a vertical plane and moves the actuator to depress the button of the switch 280.

A finger 284, which may be formed as a part of the arm 240, engages a stud 286 on the adjacent arm 120 of the seal feed mechanism. This serves to protect the strap feed limit switch arm 240 in that if the strapping should prematurely slip out of the notch 244 in the finger of switch arm 240 thereby letting the switch arm drop into the path of the advancing jaw assembly, the raising of the seal feed arm 120 attendant upon the forward movement of the push rod 96 will serve to actuate the switch arm 240, to raise it out of the path of the advancing jaw mechanism.

*Strap feed assembly*

The strap feed assembly (Figs. 2 and 10) comprises the reel 41 driven by a reversible electric motor 290 and having a cover plate 292 secured to the reel by manually operable lugs 294. An outstanding coaxial flange 296 is formed on the exterior surface of the rear wall of the reel. Associated with the reel is the idler roll 42. The force employed in paying out the strap is that of the motor applied to the reel and is consequently a pushing force. The idler roll serves the purpose of preventing the turns of strap in the coil from slipping upon each other and spreading in the paying out process. This roll is a heavy discoid member which rides on the strapping contained in the reel between the rear wall and the cover 292. It is carried by a fork 298, on which it is freely rotatable, secured by pivot 300 to the carriage. A pneumatic pressure cylinder 302 is pivotally attached to a bracket 303 at one end of the carriage by a pin 304 and a piston rod 305 projecting from the other end is connected to a lever 306, which is fixedly secured to or integral with the fork 298. The cylinder has pressure fittings, to be later described, at opposite ends thereof. Upon pressure being supplied to this cylinder to retract its piston rod 305, the loading disc is forced against the strapping with a degree of pressure sufficient to prevent slipping of the strap and hence to insure a positive feed. On the other hand when the pressure is reversed to force the piston rod 305 outwardly, the idler roll is moved away from the reel to permit reloading thereof with a fresh coil of package binder strapping. After the removal of the idler roll, the reel cover is removed by loosening the lugs 294 and a new coil of strapping may then be placed on the hub of the reel. The cover is replaced on the reel and the pressure transferred again to retract the piston rod of the cylinder which forces the idler roll against the strapping. The hub 311 of the reel has backwardly inclined slots 307 formed therein to receive a turned end portion 309 of the strap coil. When the coil is placed on the reel, it fits the hub loosely and the coil turns are loose between themselves. The first retraction and tensioning operation after its insertion, however, is sufficient to tighten the coil in both respects, and the idler roll will maintain the coil in that condition. The lower end of the strap feed guide 44 hangs near the point of tangency between the idler roll and the reel. This strap guide 44 is pivotally secured to the carriage top by bolt 310 at a point shortly below the jaw mechanism such that strap being fed upwardly therethrough will be directed into the jaw assembly. The lower part of the guide consists of two plates 312 sufficiently thin to fit between the reel wall and cover. These plates are spaced apart and welded or otherwise secured to side plates which form walls 314 to define a channel 316 through which the strapping may pass. The walls 314 extend upwardly to their point of pivotal attachment 310 to the carriage. Guide members 318 are secured between the walls 314 upwardly of the plates 312 to afford a continuation of the channel 316. The cylinder 302 will, of course, maintain a constant pressure of the idler roll against the coiled strapping in the reel regardless of diameter changes therein. The strap is guided from the feed guide into the jaw assembly by a passage 320 (Fig. 3) defined on one side by a guide plate 322 secured as by bolts 324 to the housing, and on the other side by the strap cutter block 234.

*Tensioning assembly*

Referring particularly to Figs. 11 and 12, the above referred to flange 296 on the interior surface of the strap supply reel is positioned for rotation in a deep notch 330 formed in a block 332 hereinafter called the sprag. The inner walls of the notch 330 have projections 334 formed thereon such that when the sprag is relatively normal to the part of the flange contained therein, the flange may rotate freely in the notch, whereas if the angle of the sprag relative to this flange portion is altered, the opposite sides thereof will be gripped by the projections 334 and controlled thereby. The sprag is adapted to give a clockwise thrust to the reel. The projections are offset to give maximum gripping strength as this thrust is applied. The sprag is pivotally mounted by pin 336 on the end of a piston rod 338 of an air pressure strap tensioning cylinder 340. A spring 342 is coiled around the pivot pin 336 and operates at one end 344 against the piston rod 338 and at the other end 346 against the sprag so as to urge the sprag in a clockwise direction around the point of pivotal attachment. The sprag has a boss 348 on its upper surface, the top of which is adapted to receive a screw 350. When the piston of strap tensioning cylinder 340 is in its retracted position, as shown by the full lines in Fig. 11, the head of the screw 350 abuts against a bearing plate 352 on the bottom of the cylinder, rotating the sprag counterclockwise to a position normal to the flange against the force of the spring 342, which permits the flange to move freely within the sprag. When, however, pressure is applied to the cylinder to force its piston rod outwardly and the sprag is thereby moved downwardly, the bolt moves out of engagement with the bearing plate and the spring 342 urges the sprag in a clockwise direction about its pivot 336 until the projections seize the sides of the flange. As the pressure in the cylinder continues to move the piston rod 338 out of the cylinder, the sprag then rotates the strap reel in a clockwise direction. The screw 350 may be adjusted to allow free rotation of the flange within the notch when the rod 338 is in its retracted position. It will be noted that when the sprag is drawn back, the projections release the flange such that the retraction does not rotate the reel, the idler affording sufficient frictional resistance to prevent it. To prevent the sprag from swinging laterally so as to release the flange, the side of the sprag away from the notch opening 330 is threaded to receive a bolt 353, which may be adjusted to position its head near a vertical plate 355, bolted to the carriage 20, as shown in Fig. 12.

The head end 354 of the strap tensioning cylinder 340 is secured to the clamping and sealing assembly as may be additionally noted in Figs. 4 and 5. The housing 56 has a hood 356 projecting from the side wall thereof which, with the wall, forms a downwardly opening socket 358. The head end of the cylinder 340 possesses an ear 360 which fits into the socket. The cylinder is pivotally secured therein by a pin 362 which passes transversely through the socket 358 from aligned holes in the housing 56 and the hood 356. By means of this pressure actuated linkage between the pivoted head carrying the strap clamping or anchoring and sealing assembly and the reel turning strap tensioning assembly, the application of pressure to cylinder 340 causes tension to be applied by the reel to one end of the bundle encircling strap loop in one direction (downward) and by the strap anchoring and sealing assembly to the other end of the strap loop in the opposite direction (upward). There is thus provided an elastic coupling between the free strap end anchor holding one end of the bundle encircling loop and the strap storage reel holding the other end of the loop, which insures an effective but not too abruptly applied (i. e., cushioned) tension in the opposite direction to the two ends of the bundle encircling loop. The pressure cylinder is equipped with pressure inlets 366 and 368 at the opposite ends thereof.

*Bundle encircling assembly*

The bundle encircling or strap track assembly (Figs. 13 and 14) includes an upper pivoted chute section 370 and a lower stationary trough section 372. The trough section consists of an arcuate member 374 embraced between plates 376 which constitute side walls for the trough, the parts being secured together by welding or other appropriate means. The walls 376 in turn are secured on their outer surfaces to parallel flanges which extend outwardly from a bracket 375 attached to the front of the carriage. Plates 378 providing pivot mounting means for the movable chute section are secured to the outer extremities of the walls 376. The arcuate member 374 extends above the walls 376 at its outer end 380 to avoid a gap in the strap track at the pivot point, and at its inner end this member 374 also extends beyond the walls 376, as at 382, to direct the strap against the outside surface of the cutter block 234.

Notches 384 are formed in the inner ends of the walls 376. Hooklike strap keepers 386 are pivotally secured by pins 388 to ears 390 on the walls and the hook ends 392 thereof project through the notches into the strap channel (see Fig. 14). The keepers 386 extend below the pivot point, as at 394, and horizontal compression springs 396 bear against the walls and these lower portions to urge the hooks inwardly and downwardly across the channel. The keepers abut against the top 398 of the notches to limit their motion in one direction, the normal position of the inside face 400 of the hook being substantially parallel to and slightly spaced from the floor of the strap trough. The purpose served by these keepers is to insure the strap following the trough floor to direct it into the jaws of the edge grippers 170. Were it not for these keepers the strap end would be likely to move in the outer face of the cutter block 234 at too oblique an angle for successful seizure by the edge grippers 170. When the strap is being tensioned, however, it may easily be pulled out of these keepers.

A second notch 402 is formed in one of the channel walls adjacent the keeper notch and a switch arm 404 of an electric switch 534 extends through this notch into the channel into a position above the strap. The switch housing 408 is secured to bracket 375. The arm 404 is mounted on a switch shaft 410 extending into the switch housing and rotatable therein. The shaft is spring loaded to urge the arm into an approximately horizontal position. A snap action switch 534, which may be of conventional design, is contained in the housing 408 and is actuated by the rotary motion of the shaft 410. A roller 412 is embraced in a yoke 414 formed at the free end of the arm to facilitate the passage of the strap. Thus as the strap is withdrawn inwardly from the track when the strap is retracted, it pivots the arm 404 upwardly so as to actuate the switch 534. When the strap clears the switch arm, the arm returns to its position in the channel by virtue of the spring loading.

The strap chute 370 is approximately semi-circular and comprises a continuous series of slightly spaced ball bearing assemblies 416, which together form, in effect, a floor of the chute, and curved plates 418 secured to the opposite sides thereof and extending inwardly therefrom so as to form with the ball bearing assemblies an inwardly opening channel for the strap. The inner end of the movable chute or track section 370, when it is in the closed position, fits in a receptacle 422 on the top of the jaw assembly housing, bosses 424 being formed on the sides of this inner end to rest on the top edges of the receptacle 422 to limit entry of the chute 370 into the housing. The pivoted chute may be moved between its closed position, in which the inner end rests in the receptacle 422, and its open position, in which the chute is rotated about the pivot 420, to open the track to enable the machine and bundle to be correlated for a binding operation, either manually or automatically. By this arrangement the stationary trough section 372 and the hinged chute section 370 constitute a substantially continuous inwardly open annular strap track, as best shown in Figs. 2 and 13, through which strap from the storage reel may be pushed or fed to form a loop loosely surrounding the bundle to be bound. But, by swinging the hinged chute section 370 outwardly the strap track may be opened for the reception of bundles in binding position in front of the strap anchoring and joint forming head. This capability of opening and closing the strap track is of special importance in the application of radially disposed binders about bundles of ringlike or annular shape, such as the coils of steel strip heretofore mentioned. Frequently, in the binding of bundles of other annular shape, it may not be necessary to open the strap track.

The structure by which the automatic operation is accomplished comprises a pneumatic cylinder 426 secured to the lower edges of the strap trough walls 376 by bolts 428, and oriented with the rod end 430 forward. The piston rod 432 is furnished with an extension 434 having a fork 436 formed at the forward end thereof and a pin 438 extending between the tines of the fork. A bell crank lever 440 is pivotally fixed at its mid point between plates 378 by pin 442. The lower end of this lever has a slot 444 formed therein in which pin 438 rides to accommodate the linear motion of the rod 432 to the rotary motion of the lever 440, and the upper end 446 is pivotally joined to a link 448. This link in turn is connected to an ear 450 formed on the outer surface of the chute 370 at a point above and spaced outwardly of the pivot 420. The cylinder has pressure fittings 452 and 454 at the head and rod ends, respectively. Thus, as pressure is applied to the rod end of the cylinder, the rod 432 is retracted pivoting the bell crank 440 to draw the link 448 out and down, pivoting the chute 370 to its open position. When pressure is applied to the head end of the cylinder and the rod end is vented, the rod 432 is extended, rotating the bell crank 440 counterclockwise to force the link upward, thus pivoting the chute to its closed position.

Pneumatic system

Fig. 16 represents the pneumatic system in diagrammatic form. The machine normally will be supplied with air under pressure from any convenient source connected to the duct 460. The head end of the clamping cylinder 50 is linked to the duct 460 by a conduit 462. A three-way solenoid valve 464, hereinafter called the clamping valve, is inserted in the conduit to admit pressure to or vent the cylinder, the normal inactivated position of the valve being to vent the cylinder. The head end of the sealing cylinder 52 has a conduit 466 connecting it to the duct. A three-way solenoid valve 468, hereinafter called the sealing valve, is interposed in the conduit. The valve moves between a pressure admitting and a venting position, the valve occupying the venting position when inactivated. The rod end of the sealing cylinder is linked to the duct by a similar conduit 470, a valve 472, hereinafter called the return valve and conduit 473. Here, however, the valve admits pressure into the cylinder in its inactivated position and vents it when activated.

The carriage positioning cylinder 25 is controlled by a first conduit 474 extending between the duct 460 and the head end thereof, and a second conduit 476 between its rod end and the rod end of the sealing cylinder 52.

The tensioning cylinder 340 has conduits 478 and 480 leading from the head and rod ends, respectively, to a four-way solenoid valve 482 which in turn is connected to the duct 460 by conduit 484. A manually operated pressure regulating valve 486 and pressure gauge 488 of conventional design are inserted in this conduit to adjust the tensioning to any desired degree. The valve 482 moves between the inactivated position of admitting pressure to the rod end and venting the head end, and the activated position of venting the rod end and admitting pressure to the head end of the cylinder 340.

The idler roll cylinder 302 has conduits 487 and 489 connected to the head and rod ends thereof, respectively, which lead to a manually controlled four-way valve 490. The valve serves to vent the head end and apply pressure on the rod end to force the idler roll against the coil of strapping or to reverse the pressure to remove the roll from the strapping.

The strap chute cylinder 426 has conduits 492 and 494 connected, respectively, to the head and rod ends thereof which lead to a four-way valve 496. Pressure is supplied to the valve from the duct 460 by a conduit 498. The valve serves to apply pressure to the head end and vent the rod end to close the strap chute, or vent the head end and apply pressure to the rod end to the open strap chute.

Electrical circuit

The electrical circuit is diagrammatically illustrated in Fig. 17. A source of electric power is connected between ground and terminal 500. A conductor 502 leads from the terminal to the solenoid 504 of the valve 472 which controls the rod end of the sealing cylinder. A normally open relay switch 506 is situated in the conductor between the power source and the solenoid 504. A conductor 508 which bypasses the switch 506 delivers current to the relay solenoid 510. On the power side 512 of this solenoid in the conductor 508 a normally open manually operated starting switch 514 is situated. In the other side 515 there is a normally closed relay switch 516 and a normally closed manually operated stop switch 518. Thus, when the starting switch is closed, the solenoid 510 is energized, closing switch 506. When the starting switch is released, the solenoid remains energized by current flowing through side 515 of conductor 508, the stop switch 518 and switch 516. Thus the current flows to the solenoid valve 504 to energize it, venting the rod end of the sealing cylinder. Similarly the feed terminal 520 of the motor 290 is connected to the conductor 502 through the strap feed control switch 280 in its normal position and thus is energized to feed out strapping.

When the free end of the strapping is passed around the package and intercepts the strap feed control finger 242, the switch 280 is actuated to break contact with the motor feed terminal 520 and make contact with a common terminal 522 of conductors 524 and 526. Conductor 526 leads to the strap gripping or clamping solenoid valve 464 of the head end of the clamping cylinder and, through the normally closed solenoid operated switch 528 of a holding relay 530, to the rewind terminal 532 of the motor. Thus, when the strap feed control switch is actuated, the clamping solenoid valve 464 is energized to admit pressure to the head end of the clamping cylinder 50, thereby advancing the jaw assembly to grip the free end of the strap. At the same time the motor is reversed to take up excess strap.

The retraction of the strap continues until it is retracted past the sprag switch arm 404 to close the sprag switch 534. The closing of this switch admits current through a conductor 536 containing a switch 538 to the solenoid 540 of a time relay 542. This time relay includes the solenoid 540 and the switches 544, 546 and 548. The switches 544 and 546 are normally open; the switch 548, normally closed. Upon energization of the solenoid, the switches 544 and 546 are closed and the switch 548 opened. Upon de-energization, the switch 544 returns immediately to the open position, whereas the switches 546 and 548 return to their normal positions after an adjustable time interval. The switches 528 and 538 are members of an integral control relay 530 which includes these, solenoid 550, and switch 552. The normal position of the switch 552 is open; that of the switches 528 and 538 is closed.

Terminals of switches 544 and 552 are connected to conductor 524. The other terminals of these switches are connected to a conductor 554 to which also are connected switches 546 and 548 and the solenoid 550. The other terminal of switch 546 is connected to the solenoid of the tensioning valve 482. The other terminal of switch 548 is connected to a conductor 556 leading to a circuit which will subsequently be described.

When the sprag switch 534 is closed by the retraction of excess strap, current flows through conductor 536 and switch 538 to energize solenoid 540. This closes switches 544 and 546 and opens switch 548. Current thereupon flows through conductor 524, switch 544 and conductor 554 to energize solenoid 550, opening switches 528 and 538 and closing switch 552. Switch 538 being opened, current flow to the solenoid 540 is interrupted and the solenoid is deenergized, returning switch 544 to the open position. Switches 546 and 548 remain respectively closed and open because of the delayed return. Switch 552 being closed, the solenoid 550 continues to be energized through conductor 524, this switch, and conductor 554. Switch 528 being opened, the motor is cut off. Relay 530 being thus self energized through switch 552, it is evident that it will remain energized until the conclusion of the operating cycle or the opening of switch 280.

During the interval of delayed return in relay 542 the tensioning valve 482 is energized through conductor 524, switch 552, conductor 554 and switch 546 to provide the final tensioning of the strap about the bundle. Conductor 556 is cut off by the open switch 548. Upon expiration of the time interval, switch 546 is opened and switch 548 is closed to deenergize the tensioning valve and close the circuit into conductor 556.

Conductor 556 contains one terminal of a switch 558 incorporated in a relay 560 which also includes solenoid 562 and switch 564. Switch 558 is normally closed, switch 564 is normally open. The other terminal of switch 558 is connected to the solenoid 566 of a time relay 568 by a conductor 570. The time relay also incorporates switches 572, 574 and 576. Switches 574 and 576 are normally open and switch 572 is normally closed. Switches 572 and 574 have a delayed return after deenergization as in relay 542.

Terminals of switches 572, 574, 576 and 564 and solenoid 562 are connected to a conductor 578. The other terminal of switch 572 is connected to a conductor 580 leading to a solenoid 582 of relay 584. The other terminal of switch 574 is connected to the solenoid of valve 468. The other terminals of switches 564 and 576 are connected to conductor 556.

Upon the closing of switch 548 current flows through the conductors 556 and 570 and the closed switch 558 to energize solenoid 566. Thereupon switches 574 and 576 are closed and switch 572 is opened. The closing of switch 574 energizes valve 468 to admit pressure to the head end of the sealing cylinder. The closing of switch 576 admits current through conductor 578 to energize the solenoid 562 which opens switch 558 and closes switch 564. The opening of switch 558 deenergizes solenoid 566 thereby opening switch 576. Solenoid 562 continues to be energized through switch 564. Switches 572 and 574 continue respectively open and closed until the expiration of the time interval. They then resume their non-energized normal position which returns valve 468 to its pressure venting position at the same time the circuit through switch 572 is closed and the solenoid 582 is energized to open switch 516. This deenergizes solenoid 510 to open switch 506 to break the circuit and complete the cycle. Relays 530 and 560 are deenergized to return to their normal positions, and the feed control switch 280 is permitted to return to its normal position in contact with the feed terminal of the motor upon completion of the seal and removal of the package. Simultaneously pressure is again admitted to the rod end of the sealing cylinder 52 whereby the jaw assembly is returned to its retracted position. The pressure also is admitted through the sealing cylinder to the rod end of the carriage positioning cylinder 25 to back the carriage away from the line.

Summary of operation

A typical binding operation of a machine associated with a bundle conveyor system and applying binder strapping radially to an annular or ringshaped bundle, such as a coil of steel strip, will now be briefly reviewed, special reference being made to Figs. 16 and 17.

In normal or inactive condition, with air pressure turned on and "start" switch 514 open, the various air controlled valves will be in the position indicated by the full lines of Fig. 16. In that condition fluid pressure is applied, through solenoid valve 472, to the rod or forward end of sealing cylinder 52, the head or rear ends of both the sealing cylinder and strap clamping cylinder 50 being vented through solenoid valves 468 and 464, respectively. Likewise pressure is applied to the rod or forward end of the tensioning-sprag cylinder 340 and the head or rear end of this cylinder is vented through tensioning cylinder valve 482. Thus the forward end of the pivoted strap anchoring and sealing head 56 is in its down position and the strap-edge gripping, joint forming and strap cut-off mechanisms enclosed therein are retracted with the strap edge gripping jaws 170 and the folding jaws 166 open and, let it be assumed, a joint-reinforcing seal therebetween against the anvil 169; also the sprag, which imparts the final tension to the strap loop, is conditioned to permit free rotation of the strap storage reel by the motor. At the same time through pipe 474, leading from pressure duct 460, and through pipe 476, leading from the rod end of sealing cylinder 52, an equalization of pressure on opposite sides of the piston 32 of the carriage cylinder 25 exists and spring 29 holds the carriage in retracted position to facilitate the placement of a bundle in position to be bound.

If the bundles being delivered to the binding machine are of shapes other than annular or ringlike, it may be unnecessary to open the strap track (as a matter of fact the track need not be openable) since such bundles can frequently be moved into proper position in front of the machine's head merely by pushing them into place through the hollow center of the closed track. But if, as assumed, the bundles delivered to the machine are annular or ringlike, then, by the manipulation of track valve 496, the rod or forward end of track cylinder 426 is connected to air pressure through pipes 498 and 494 and the head or rear end is vented through pipe 492. Cylinder 426 thereupon retracts its piston to swing the pivoted chute section 370 to open condition. Then the bundle is moved into binding position where it is supported wholly independent of the machine, the movable chute section is again pivoted to closed position, passing through the central opening of the coil to be bound, and the strap track is ready to guide the binder in a loose loop about the bundle.

The operator now closes "start" switch 514, completing three circuits, one of which includes the winding 504 of solenoid valve 472, the second of which includes feed limit switch 280 and its contact 520 and the "feed" windings of the reel driving motor M, and the third of which is a holding circuit which includes the holding winding 510 of switch 506, manual "stop" switch 518 and the automatically operated cycle-terminating switch 516. Thereupon the rod or forward end of sealing cylinder 52, and, through it and pipe 476, the rod or forward end of carriage cylinder 25 are vented; permitting the pressure applied to the head end of the carriage cylinder 25 through pipe 474 to advance the carriage, against the tension of spring 29, toward the bundle to be bound. Also the motor starts to rotate strapping storage reel 41 in the direction to feed out strapping from the coil thereon (counterclockwise, as viewed in Figs. 2 and 16) and the binding cycle is started, not to be interrupted until switch 506 is automatically opened at the completion of the cycle, as will be later explained, or the "stop" switch is opened by the operator, should he for some reason desire to stop the machine before the binding cycle is finished.

The rotation of the strap reel, cooperating with the pressure controlled slip-preventing "idler" 42 feeds binder strapping from the coil on that reel substantially vertically up past the reinforcing seal positioned between the folding jaws into and around the strap track in a clockwise direction, as viewed, for example, in Fig. 2. The free end of the strap follows the closed strap track, passing under the arm 404 of sprag switch 534, behind the spring biased strap-keepers 386, and then again upwardly past the outside of stationary cutter block 234 into the notch 244 in the end of the strap feed control finger 242 of switch arm 240, which arm under the thrust of the free end of the bundle encircling strap loop actuates feed control switch 280 to transfer it to contact 522 and move arm 240 out of the path of the jaws when they subsequently advance. At this time both ends of the bundle encircling loop of binder strapping are located slightly in front of the joint reinforcing seal.

The transfer of strap feed control switch 280 to contact 522 completes a circuit through the operating solenoid of clamping cylinder valve 464 which admits pressure to the head or rear end of strap anchoring or clamping cylinder 50 to advance the piston 58 therein. The forward movement of piston 58 of clamping cylinder 50 advances, through the agency of push rod 96, the strap gripping and seal folding jaws and the anvil. This causes the anvil 169 to advance the seal partly to encompass the overlapping ends of the package encircling binder loop and then the folding jaws 166 to close and bend the flanges of the reinforcing seal about the overlapping ends of the binder loop and the gripping jaws 170 to close upon the edges of the free end of the strap loop to anchor it. Also the transfer of feed control switch 280 completes a circuit through the "rewind" windings of motor M to cause the motor to rotate the strapping storage reel in a reverse direction (clockwise, as viewed in Figs. 2 and 16) to retract and rewind upon the coil in the storage reel the excess length of strapping looped by the strap track about the bundle. Thus the bundle encircling loop of strapping is contracted from the strap track and, in effect, shrunk down upon the bundle. Further, as the clamping and folding jaws, the notchers and the cutter blade are moved forward by push rod 96, that push rod, through the advance of cross rod 128 between the two seal ejector arms 120, raises the seal ejector slide 134 above the level of the seals in the seal magazine, putting springs 149 under tension for the subsequent return of the ejector slide and the movement thereby of the foremost seal into position between the seal-folding jaws, as previously explained.

In the final stages of the shrinkage of the strap encircling binder loop upon the bundle it is pulled through the keepers 386 and actuates arm 404 of sprag switch 534 to close that switch. The closure of sprag switch 534 energizes relay 542 which closes switches 544 and 546 (the closure of switch 546 energizing the solenoid of the tensioning or sprag cylinder valve 482) and opens switch 548. The energization of the solenoid of valve 482 permits pressure to be applied, through pipe 478, to the head or rear end of sprag cylinder 340, and, through pipe 480 vents the rod or forward end thereof; the piston of cylinder 340 advances to permit the sprag to tilt and cause the sprag to grip the flange of the storage reel and rotate the reel further in strap retracting direction (clockwise as viewed in Figs. 2 and 16) to exert the final tensioning pull upon one end of the strap encircling binder loop, the other end of which is anchored by grippers 170. At the same time the pressure applied to the tensioning-sprag cylinder 340 exerts a cushioned or resilient upward thrust upon the outer end of pivoted head 56 and since head 56 carries, among other things, the jaws 170 gripping the free end of the strap loop, a regulated strong but cushioned pull is applied in opposite directions to the two ends of the binder encircling loop, as previously explained.

The closure of switch 544 of relay 542 completes an energizing circuit for relay 530, which opens the circuit for relay 542 at switch 538. However, the deenergization of relay 542 does not immediately result in the release of the sprag from the strap storage reel because of the delayed return of switch 546 to open position, which delay insures that the tensioning cylinder valve 482 retains pressure in sprag cylinder 340 to keep the sprag in action and thereby hold the tension imparted to the two ends of the bundle encircling strap loop until the two ends of the loop are permanently joined.

At the end of the interval of the delayed opening of switch 546, that switch opens, opening the circuit of the solenoid of tensioning-sprag valve 482 which results in pressure being applied to the rod or forward end and the venting of the head or rear end of tensioning-sprag cylinder 340 and the return to normal position of the reel turning sprag. Further, at the end of the delayed return to closed position of switch 548, of relay 542, a circuit is completed to energize the coil 566 of relay 568. The operation of relay 568 closes switches 574 and 576 and opens switch 572. The closure of switch 574 energizes the solenoid of sealing cylinder valve 468 which operates to apply pressure to the head end of sealing cylinder 52 to advance the notchers 168 to complete the joint and to advance the movable cut-off blade 172 to sever, adjacent the finished joint, the strap loop about the bundle from the strap coming from the reel. At this time the forward end of the pivoted anchoring and sealing head 56 returns to normal position.

The closure of switch 576 of relay 568 closes a circuit to the coil 562 of relay 560 (which closes and holds closed its switch 564) to open switch 558 of relay 562. The opening of switch 558 opens the circuit of the coil 566 of relay 568 and relay 568 is deenergized. However, the delayed return of switch 574 of relay 568 keeps closed the circuit for the sealing cylinder control valve 468 for a period of time sufficient to insure the making of the seal-joint and the operation of the movable strap cut-off blade 172. When the period of delay in the operation of switch 574 expires, this switch opens to deenergize the solenoid of the sealing cylinder valve 468. The deenergization of the solenoid of valve 468 vents the head or rear end of sealing cylinder 50.

The delayed return of the closing of switch 572 completes a circuit through the coil 582 of the automatic stop relay switch 516. This opening of the switch 516 opens the holding circuit for the coil of relay 510 of switch 506 which then opens the main circuit. The opening of the main circuit deenergizes the solenoid of clamping cylinder valve 464 and the head end of that cylinder is again vented therethrough. Likewise the solenoid 504 of valve 472 is deenergized and the return of that valve to normal reapplies pressure to the rod ends of sealing cylinder 52 and carriage cylinder 25. The result of the reapplication of pressure to the rod or forward end of sealing cylinder 52 is that the push rod 96 is moved backward to open the folding and gripping jaws and retract them, the notchers, the anvil, and the movable cutter blade. The retraction of push rod 96 also permits the tensioned springs 149 to move the outer ends of ejector arms 120 downward to cause the seal ejector slide 134 to descend and move the foremost seal in the seal magazine down in front of the then retracted jaws and anvil. The descent of ejector arms 120 permits the return of switch arm 240 to normal position, which results in the transfer of strap feed control switch 280 back to strap-feeding contact 520. The reapplication of pressure to the forward or rod end of carriage cylinder 25 causes the carriage to be backed away or retracted from binding position by spring 29, as previously explained.

The bundle is now bound, the strap loop binding it is severed from the source of strap supply, and the bundle is ready for removal or for the application of another tensioned binder, as required. If the bound bundle is of annular or ringlike shape and all of the required binders have been applied thereto, the strap chute is opened and the bound bundle may be removed.

The machine is now in normal condition for the receipt of a new bundle to be bound and a repetition of the binding cycle just reviewed.

Having thus described our invention, what we claim as new and desire to secure by Letters Patent of the United States is:

1. An automatic strapping machine comprising a rotatable reel for steel strap, a reversible motor connected to drive the reel to feed and retract strap when operated in one direction or the other respectively, track means adapted to direct strap fed by said reel in a closed circuit to bring a free end of said strap into overlapping relationship with another portion thereof to form a loop, about a bundle, strap gripping means operating in conjunction with said reel for tensioning the strap loop by gripping and pulling the free end of said strap in one direction while the reel pulls on the other end of the loop, sealing means for forming a joint in the overlapped portions of the strap loop, and a strap cutter adapted to sever the loop from strap coming from the reel at a point adjacent to said joint.

2. A strap tensioning assembly for an automatic strapping machine wherein the strap is fed from a strap coil mounted on a strap reel so as to encircle a package, comprising holding means for the free strap end, means to engage a locus on said reel spaced from the axis thereof to apply torque thereto, and a member powered for longitudinal expansion operatively linking said holding means and said reel engaging means.

3. A strap tensioning assembly for an automatic strapping machine wherein strap is fed from a coil to encircle a package such that the free end of the strap overlaps a standing portion thereof, comprising means movable in the direction of strap extension for holding the free end of said strap, power means connected to the coil for moving the standing portion thereof by moving the coil, and linkage means interconnecting said power means and said movable means for utilizing the force reaction developed by said power means in moving the coil for moving said movable means, whereby pull in opposite directions is exerted on said free end and said standing portion of said strap to tension the strap about the package.

4. A strap tensioning assembly in an automatic strapping machine including a carriage, a strap reel having a strap coil mounted thereon and means for feeding strap from said coil to encircle a package; comprising an elongated jaw assembly pivotally mounted at one end on said carriage, jaws adapted to grasp the free end of the strap after package encirclement mounted on the other end of said assembly, means for rotating said reel to retract the strap, and means spacing said jaws and said retracting means whereby resistance to the retraction of the strap imposes arcuate motion on said jaws.

5. An automatic strapping machine of the type described comprising, in combination, a carriage, a housing having one end pivotally mounted on said carriage, a jaw assembly carried in said housing at its opposite end, said jaw assembly including means for gripping steel strap and means for forming a strap seal, means in said housing to operate said gripping means and said sealing means, a strap reel rotatably mounted on said carriage to contain a coil of strap, reversible means for driving said reel to pay out and retract the strap, means for directing the strap around a package, a control responsive to the encirclement of the package, means responsive to the actuation of said control to cause said gripping means to grip the free end of the strap and said reversible reel driving means to retract the strap, means engageable with said reel for rotating said reel to retract the strap, means connected to said retracting means and said housing for spacing said housing and said gripping jaws mounted therein and said retracting means whereby resistance to the retraction of the strap imparts arcuate motion to said housing and said gripping jaws to tension the strap about the package, a control responsive to the retraction of the strap and the tensioning of the strap about the package, and means responsive to the actuation of the last said control to seal the overlapping portions of the strap.

6. An automatic strapping machine of the type described, comprising in combination a carriage, a housing mounted on said carriage, a jaw assembly carried by said housing, said jaw assembly including means for gripping steel strap, means for forming a strap seal, means in said housing to operate said gripping means and said sealing means, a strap reel mounted on said carriage to contain a coil of strap, reversible means for driving said reel to pay out and retract the strap, means for directing the strap around a package, a control adapted to be actuated upon the encirclement of the package, said control being connected to initiate said grasping means to grasp the free end of the strap and to reverse said reel driving means to retract the strap about the package, a control interposed between the strap and the package through which the strap may move and in so moving be actuated thereby, an expansible member linking said housing and said reel, said interposed control being connected to expand said expansible member to tension the strap about the package, and actuate said sealing means to form a seal.

7. In a bundle binding machine for use with a support carrying a bundle to be bound and comprising, the combination with an inwardly open annular strap track for guiding a length of binder strapping around the bundle to be bound, a reversible rotatable storage reel for holding a coil of strapping, means for driving the reel in opposite directions, in one direction to feed strap from the coil around the track to encircle the bundle with a strap loop having ends adjacent each other and in the other direction to retract excess strap back to the coil and contract the strap loop upon the bundle, an anchor for holding the free end of the strap loop against the retracting pull of the reel, sealing mechanism for joining the ends of the contracted bundle encircling loop of strap, and strap cutting means for severing the strap between the loop and the coil on the storage reel; of a movable carriage holding the strap track, the strap storage reel and the means for driving it, the free end anchor, the sealing mechanism and the strap cutting means; means for advancing the carriage toward a bundle held by the support and retracting it from the bundle; and means for sequentially initiating the advance of the carriage, the feeding of the strap in a loop around the track, the anchoring of the free end of the strap loop, the retraction of strap by the reel to contract the loop upon the bundle, the joining of the ends of the bundle encircling loop, the severing of the loop from the coil on the storage reel and the return of the carriage.

8. A bundle binding machine of the type including an annular strap track by which strap from a reel may be fed endwise to encircle the bundle with a loop of strap, a reel for holding a coil of strap, and a reversible motor for driving the reel in opposite directions to feed out and to retract strap to encircle the bundle with a loop of strap, characterized by a fluid actuated clamp for grasping the reel and rotating it in a strap retracting direction to put final tension in the bundle encircling strap loop.

9. A bundle binding machine of the type including an annular strap track by which strap from a reel may be fed endwise to encircle the bundle with a loop of strap, a reel for holding a coil of strap, and a reversible motor for driving the reel in opposite directions to feed out and to retract strap to encircle the bundle with a loop of strap, characterized by a power actuated clamp which in one position permits the reel to turn freely and in another position grasps the reel and rotates it.

10. A bundle binding machine of the type including an annular strap track by which strap from a reel may be fed endwise to encircle the bundle with a loop of strap, anchoring means for the free end of the strap, a reel for holding a coil of strap, and a reversible motor for driving the reel in opposite directions to feed out strap from the coil to encircle the bundle with a loop of strap and to retract strap to the coil to contract the loop upon the bundle, characterized by a clamp for grasping the reel and rotating it in a strap retracting direction to put final tension in the bundle encircling strap loop, and a fluid actuated means interposed between the strap anchoring means and the reel clamp for simultaneously causing the clamp to actuate the reel to pull one end of the strap loop in one direction and move the strap anchoring means to pull the other end of the strap loop in the opposite direction.

11. A bundle binding machine of the type having an annular strap track by which strap fed endwise from a reversible reel may be looped about the package to be bound and retracted to bind the bundle and having means connected to the reel for driving the latter in opposite directions, characterized by a movable anchor for the free end of the strap loop, and a fluid pressure actuated expansible linkage between the movable anchor and the strap reel to cause the anchor to exert tension on one end of the strap loop in one direction while the reel exerts tension on the other end of the loop in the opposite direction.

12. In a bundle binding machine, the combination of a pivotally mounted head containing anchoring means for one end of a strap loop trained about a bundle, an inwardly open strap track along which strap may be pushed to form the loop about the bundle, a reel for holding a coil of strap, a reversible motor for driving the reel in opposite directions to uncoil strap from the coil and push it along the track into a closed loop about the bundle and to retract the strap to the coil to withdraw the strap loop from the track and contract the loop upon the bundle, a reel turning device operable independently of the motor to rotate the reel in retracting direction to tension the strap loop about the bundle, and a fluid actuated piston and cylinder connected between the pivoted head and the reel turning device to cause the reel to exert tension on one end of the strap loop in one direction and the anchoring means to exert tension on the other end of the strap loop in the opposite direction.

13. A bundle binding machine of the type having an annular track for directing flexible metallic strapping in a closed overlapping ended loop about the bundle to be bound; a movable anchor for the advanced free end of the strapping loop; and means for joining the overlapping ends of the loop; characterized by a reversible storage reel for holding a coil of strapping, means connected to and adapted to rotate the reel in one direction to unwind the coil and push strapping from it about the track and to rotate the reel in the reverse direction to rewind strapping upon the coil to retract the loop from the track and shrink it upon the bundle; a presser roller for engaging the periphery of the coil of strapping on the reel to keep the outer turns of the coil in frictional contact and cooperate with the coil in the feeding out of the strapping; and a cushioning connection between the movable free end anchor and the reel to move the reel in a retracting direction and the free end anchor in the opposite direction to impart opposing tensioning pulls on the two ends of the bundle encircling loop of strapping.

14. A bundle binding machine of the type having an annular track for directing flexible metallic strapping in a closed overlapping ended loop about the bundle to be bound; a movable anchor for the advanced free end of the strapping loop; and means for joining the overlapping ends of the loop; characterized by a reversible storage reel for holding a coil of strapping, means connected to and adapted to rotate the reel in one direction to unwind the coil and to push strapping from it about the track and to rotate the reel in the reverse direction to rewind strapping upon the coil to retract the loop from the track and shrink it upon the bundle; a presser roller for engaging the periphery of the coil of strapping on the reel to keep the outer turns of the coil in frictional contact and cooperate with the coil in the feeding out of the strapping; a cushioning connection between the movable free end anchor and the reel to move the reel in a retracting direction and the free end anchor in the opposite direction to impart opposing tensioning pulls on the two ends of the bundle encircling loop of strapping; and means for sequentially initiating the rotation of the storage reel in a feeding direction, the action of the anchor to hold the free end of the bundle encircling loop of strapping, the reversal of the storage reel to retract strapping and contract the loop upon the bundle and the sealing means.

15. In an automatic strapping machine of the type described having a strap feed assembly comprising a rotatable strap reel having a coil of strapping thereon, means for anchoring the inner end of the coil to said reel, a reversible motor connected to and adapted to drive said reel in opposite directions to feed and retract strapping from the coil when operated in one direction or the other, respectively, and a rotatable circular element adapted removably to ride on said coil, the improvement which comprises a reversible pressure exerting means adapted when moved in one direction to force said circular element against the coil to prevent slippage and increase the frictional engagement between the turns of the coil when said reel is being driven in strap feeding direction, said pressure exerting means comprising an expansible cylinder-piston combination having one of its component parts connected to a fixed part of the machine and the other connected to said circular element to move said circular element into and out of pressure exerting position.

16. In an automatic machine of the type described, a strap feed control assembly comprising a reel having a coil of strap mounted thereon from which strap is adapted to be fed to encircle a bundle and on which the excess of the strap fed is rewound, said reel having a diameter not less than the internal diameter of the strap coil so that the periphery of the reel engages the innermost convolution of the strap coil through substantially its entire length thereby to effect a positive drive between said reel and the coil for driving the same in feeding and rewinding directions, said reel constituting the sole means for rewinding the coil, guide means to direct the strap fed from the coil to encircle the bundle, a gripper movable bodily between retracted and advanced positions and operable in the advanced position to grip the free end of the strap at the end of bundle encirclement, a reversible motor connected to and adapted to drive said reel in a first direction to feed strap from the coil and to push it through said guide means in bundle encircling direction and in a second direction to retract the excess strap fed from the coil, to shrink the bundle encircling loop of strap down onto the bundle, and to rewind the retracted strap on the coil, and a strap feed control means adapted to be actuated by the strap encircling the bundle when the bundle has been completely encircled, said control means being connected to reverse said motor to drive said reel in said second direction.

17. In an automatic machine of the type described, a strap feed control assembly comprising a reel having a coil of strap mounted thereon from which strap is adapted to be fed to encircle a bundle and on which the excess of the strap fed is rewound, said reel having a diameter not less than the internal diameter of the strap coil so that the periphery of the reel engages the innermost convolution of the strap coil through substantially its entire length thereby to effect a positive drive between said reel and the coil for driving the same in feeding and rewinding direction, said reel constituting the sole means for rewinding the coil, guide means to direct the strap fed from the coil to encircle the bundle, a gripper movable bodily between retracted and advanced positions and operable in the advanced position to grip the free end of the strap at the end of bundle encirclement, a reversible electric motor connected to and adapted to drive said reel in a first direction to feed strap from the coil and to push it through said guide means in bundle encircling direction and in a second direction to retract the excess strap fed from the coil, to shrink the bundle encircling loop of strap down onto the bundle, and to rewind the retracted strap on the coil, a control circuit for said motor including a switch means to reverse said motor, a control element lying in the path of and adapted to intercept the free end of the strap and to be actuated thereby when the bundle has been completely encircled, and means connecting said control element to actuate said switch means thereby to effectuate the reversal of said motor.

18. An automatic machine as claimed in claim 16 including means engageable with said strap reel for applying tension to the strap encircling the bundle, means for forming a joint in the overlapping portions of the strap encircling the bundle, and an electric circuit including control means for said tensioning means and said joint forming means, said circuit including a control switch interposed between the bundle and the encircling strap to permit the passage of strap therethrough and to be actuated thereby, said control switch being connected to initiate operation of said tensioning means and said joint forming means.

19. An automatic strapping machine as claimed in claim 1, wherein said strap directing track means comprises a sectionalized annular strap track, at least one section of said strap track being movable relative to another strap track section, and a power actuated expansible element connected to a fixed part of the machine and to said movable strap track section to separate it from another section to open said track for the reception and removal of a bundle and to return said movable section to form a substantially closed strap directing and guiding track about the bundle after the bundle has been received in strapping position; and including means for supplying power to said element to operate it in track opening and in track closing directions.

20. An automatic machine as claimed in claim 16, including a presser roller for engaging the periphery of the coil of strap on said reel to keep the outer turns of the coil tight and to cooperate with the coil in the feeding out of the strap.

21. An automatic machine as claimed in claim 16, including a presser roller for engaging the periphery of the coil of strap on said reel to keep the outer turns of the coil tight and to cooperate with the coil in the feeding out of the strap, and power actuated means mounted on a fixed part of the machine and connected to said roller for pressing said roller against the periphery of the strap on said reel to insure the proper functioning of said presser roller.

22. An automatic machine as claimed in claim 1, including a presser roller for engaging the periphery of the coil of strap on said reel to keep the outer turns of the coil tight and to cooperate with the coil in the feeding out of the strap.

23. An automatic machine as claimed in claim 1, including a presser roller for engaging the periphery of the coil of strap on said reel to keep the outer turns of the coil tight and to cooperate with the coil in the feeding out of the strap, and power actuated means mounted on a fixed part of the machine and connected to said roller for pressing said roller against the periphery of the strap on said reel to insure the proper functioning of said presser roller.

References Cited in the file of this patent

UNITED STATES PATENTS

| Number | Name | Date |
|---|---|---|
| 227,590 | Sheppard | May 11, 1880 |
| 1,825,449 | Haller | Sept. 29, 1931 |
| 2,095,820 | Lenz | Oct. 12, 1937 |
| 2,194,108 | Wright | Mar. 19, 1940 |
| 2,269,308 | Gates et al. | Jan. 6, 1942 |
| 2,346,254 | Ernst | Apr. 11, 1944 |
| 2,366,352 | Paxson | Jan. 2, 1945 |
| 2,368,775 | Perret | Feb. 6, 1945 |
| 2,386,533 | Yoder | Oct. 9, 1945 |
| 2,409,652 | Workman | Oct. 22, 1946 |
| 2,416,585 | Holub | Feb. 25, 1947 |
| 2,416,859 | Vining et al. | Mar. 4, 1947 |
| 2,438,386 | Chamberlain | Mar. 23, 1948 |
| 2,523,571 | Humm | Sept. 26, 1950 |
| 2,579,176 | Dalton | Dec. 18, 1951 |
| 2,597,675 | Sackett | May 20, 1952 |

FOREIGN PATENTS

| 565,223 | Germany | Nov. 28, 1932 |